United States Patent [19]
Kambara et al.

[11] Patent Number: 6,091,406
[45] Date of Patent: Jul. 18, 2000

[54] GRATING TRANSDUCER FOR ACOUSTIC TOUCHSCREENS

[75] Inventors: Shigeki Kambara, Kamiyobe; Hiroshi Kaneda, Hyogo, both of Japan; Robert Adler, Northfield, Ill.; Joel Kent, Fremont; Bruce W. Maxfield, Alameda, both of Calif.; Masao Takeuchi, Tokyo, Japan

[73] Assignee: ELO TouchSystems, Inc., Fremont, Calif.

[21] Appl. No.: 08/998,051

[22] Filed: Dec. 24, 1997

[51] Int. Cl.[7] .............................. G09G 5/00; G06K 11/14; G08C 21/00
[52] U.S. Cl. ........................................ 345/177; 178/18.04
[58] Field of Search .................... 345/177, 173; 178/18.04, 18.03, 18.01

[56] References Cited

U.S. PATENT DOCUMENTS

| | | | |
|---|---|---|---|
| Re. 33,151 | 1/1990 | Adler | 340/712 |
| 3,673,327 | 6/1972 | Johnson et al. | 178/18 |
| 3,893,047 | 7/1975 | Lardat | 333/30 R |
| 4,642,423 | 2/1987 | Adler | 345/177 |
| 4,644,100 | 2/1987 | Brenner et al. | 178/18 |
| 4,645,870 | 2/1987 | Adler | 178/19 |
| 4,700,176 | 10/1987 | Adler | 345/177 |
| 4,746,914 | 5/1988 | Adler | 340/712 |
| 4,791,416 | 12/1988 | Adler | 340/712 |
| 5,072,427 | 12/1991 | Knowles | 367/118 |
| 5,162,618 | 11/1992 | Knowles | 178/18 |
| 5,177,327 | 1/1993 | Knowles | 178/18 |
| 5,243,148 | 9/1993 | Knowles | 178/18 |
| 5,260,521 | 11/1993 | Knowles | 178/18 |
| 5,329,070 | 7/1994 | Knowles | 178/18 |
| 5,400,788 | 3/1995 | Dias et al. | 125/662.03 |
| 5,451,723 | 9/1995 | Huang et al. | 178/18 |
| 5,591,945 | 1/1997 | Kent | 345/177 |
| 5,648,643 | 7/1997 | Knowles et al. | 345/177 |
| 5,673,041 | 9/1997 | Chatigny et al. | 341/22 |
| 5,708,461 | 1/1998 | Kent | 345/177 |
| 5,854,450 | 12/1998 | Kent | 345/177 |

FOREIGN PATENT DOCUMENTS

| | | |
|---|---|---|
| 08305481 | 11/1996 | Japan . |
| 08305482 | 11/1996 | Japan . |
| 9402911 | 2/1994 | WIPO ............... G06K 11/14 |
| WO9402911 | 2/1994 | WIPO . |

OTHER PUBLICATIONS

R.F. Humphreys and E.A. Ash, "Acoustic Bulk–surface–wave–transducer," Electronics Letters, vol. 5, No. 9, May 1, 1969.

Masao Takeuchi & Hiroshi Shimuzu, "Theoretical analysis of grating couplers for surface acoustic waves," Journal of the Acoustic Society of Japan, 36(11): 543–557 (Jun. 24, 1980).

J. Melngailis & R.C. Williamson, "Interaction of Surface Waves and Bulk Waves in Gratings: Phase shifts and sharp Surface Waves/Reflected Bulk Wave Resonances," Proc. 1978 IEEE Ultrasonics Symposium, p. 623.

Herman A. Haus, Annalisa Lattes & John Melngailis "Grating Coupling between Surface Acoustic Waves and Plate Modes", IEEE Transactions on Sonics and Ultrasonics, p. 258 (Sep. 1980).

RF Humphryes & EA ASH "Acoustic Bulk–surface–wave transducer," Electronics Letters (vol. 5 No. 9) May 1, 1969.

M. Takeuchi & K. Yamanouchi "Undirectional excitation of plate waves in a periodic structure," Res. Inst. Elec. Comm. Tohoku University, (Oct. 1991).

*Primary Examiner*—Richard A. Hjerpe
*Assistant Examiner*—Benjamin D. Bowers
*Attorney, Agent, or Firm*—Milde, Hoffberg & Macklin, LLP

[57] ABSTRACT

An acoustic touch sensing device, comprising a substrate, having a surface; and an acoustic wave transducer, transducing a bulk wave in said substrate propagating through said substrate along an axis intersecting said surface, wherein energy of said bulk wave is coupled to a wave having a converted wave mode with appreciable energy at said surface and propagating along said surface. The device may include a set of scattering centers to couple the bulk wave to a Rayleigh wave or plate wave. The Rayleigh wave or plate wave may be dispersed over a region of the substrate, and analyzed to detect a perturbation indicative of a position of touch.

73 Claims, 12 Drawing Sheets

GRATING TRANSDUCER FOR ACOUSTIC TOUCHSCREENS

TECHNICAL FIELD

The present invention relates to the field of ultrasonic transducers, and more particularly to grating transducers for acoustic touchscreens.

BACKGROUND ART

Touchscreens are input devices for interactive computer systems. They are increasingly used commercially for applications such as information kiosks, order entry systems for restaurants, etc.

The dominant touchscreen technologies are resistive touchscreens, capacitive touchscreens, and acoustic touchscreens. Acoustic touchscreens, i.e., ultrasonic touchscreens, are particularly advantageous when the application demands very durable touch sensitive surface and minimal optical degradation of the displayed image.

Various types of ultrasonic transducers are known. The most common types used in acoustic touchscreens are wedge transducers and direct coupling between a piezoelectric transducer element and the touch substrate. A transducer is a physical element or set of elements which converts energy from one form to another. This includes converting between acoustic wave modes and converting between electrical and acoustic energy. Typically used piezoelectric transducers are formed of a rectangular prismatic piezoelectric ceramic having conductors formed on the surface, which are acoustically coupled to a surface by mounting a flat surface of the ceramic element or metallic electrode formed on the surface flush with a surface of a substrate element, for example the wedge material.

A wedge transducer induces surface-bound waves or plate waves into a substrate. The wedge transducer utilizes the phenomenon that acoustic waves are refracted when they are obliquely incident on a boundary surface of different media. A typical wedge transducer typically consists of a plastic wedge, having a piezoelectric element mounted on a one side, and the hypotenuse adhered to the substrate, which is for example glass. The piezoelectric element couples to a bulk wave in the wedge material. This bulk wave propagates at the critical angle, i.e., the "wedge angle", to refract to or from a horizontally propagating wave in the glass. The wedge material is chosen to have a bulk wave acoustic velocity that is slower than the phase velocity of the desired mode in the touch substrate; the cosine of the wedge angle equals the ratio of these two velocities. Wedge transducers may thus be used for both transmitting and receiving Rayleigh waves, Love waves, and plate waves such as Lamb waves.

In contrast, direct-coupling or "edge" transducers typically provide a piezoelectric element that is directly bonded to the touchscreen substrate in such a fashion that an acoustic wave with appreciable power at a surface of the substrate is directly generated. The interface thus serves the mechanical function of connecting the piezoelectric element to the substrate, as well as the acoustic function of coupling to the desired acoustic mode. FIG. 2B of U.S. Pat. No. 5,162,618, incorporated herein by reference, illustrates an edge transducer used to launch Lamb waves into a thin substrate. See also, U.S. Pat. No. 3,893,047, Lardat. Edge transducers are most naturally used to couple to plate waves with no nodes as a function of depth in the substrate. Some work has been done to develop edge transducers that couple to Rayleigh waves. See Ushida, JP 08-305481 and JP 08-305482, incorporated herein by reference. While such an edge transducer is compact, this leaves the piezoelectric transducer unprotected.

One type of known acoustic touch position sensor includes a touch panel or plate having an array of transmitters positioned along a first edge of a substrate for simultaneously generating parallel surface bound or plate waves that directionally propagate through the panel to a corresponding array of detectors positioned opposite the first array on a second edge of the substrate. Another pair of transducer arrays is provided at right angles to the first set. Touching the panel at a point causes an attenuation of the waves passing through the point of touch, thus allowing interpretation of an output from the two sets of transducer arrays to indicate the coordinates of the touch. This type of acoustic touch position sensor is shown in U.S. Pat. No. 3,673,327 and WO 94/02911, Toda, incorporated herein by reference. Because the acoustic wave diverges, a portion of a wave emitted from one transmitting transducer will be incident on a set of receiving transducers, allowing finer discrimination of touch position than a simple one-to-one relation of transmit and receive transducers would allow. These systems require a large number of transducers.

A commercially successful acoustic touchscreen system, termed the Adler-type acoustic touchscreen, as show in FIG. 1, efficiently employs transducers, by spatially spreading the signal and analyzing temporal aspects of perturbation as indicative of position. A typical rectangular touchscreen thus includes two sets of transducers, each set having a different axis aligned respectively with the axes of a physical Cartesian coordinate system defined by a substrate. An acoustic pulse or pulse train is generated by one transducer, propagating as, e.g., a narrow Rayleigh wave along an axis which intersects an array of reflective elements, each element angled at 45° and spaced corresponding to an integral number of wavelengths of the acoustic wave pulse. Each reflective element reflects a portion of the wave along a path perpendicular to the axis, across a broad region of the substrate adapted for touch sensing, to an opposing array and transducer which is a mirror image of the first array and transducer, while allowing a portion to pass to the next reflective element of the array. The transducer of the mirror image array receives an acoustic wave consisting of superposed portions of the incrementally varying wave portions reflected by the reflective elements of both arrays, directed antiparallel to the emitted pulse. The acoustic waves are thus collected, while maintaining the time dispersion information which characterizes the axial position from which an attenuated wave originated. Wavepaths in the active region of the sensor have characteristic time delays, and therefore a wavepath or wavepaths attenuated by an object touching the touch sensitive region may be identified by determining a timing of an attenuation in the composite returning waveform.

A second set of arrays and transducers are provided at right angles to the first, and operate similarly. Since the axis of a transducer corresponds to a physical coordinate axis of the substrate, the timing of an attenuation in the returning wave is indicative of a Cartesian coordinate of a position on the substrate. The coordinates are determined sequentially to determine the two dimensional Cartesian coordinate position of the attenuating object. The system operates on the principle that a touch on the surface attenuates surface bound or plate waves having a power density at the surface. An attenuation of a wave traveling across the substrate causes a corresponding attenuation of waves impinging on the receive transducer at a characteristic time period. Thus, the controller need only detect the temporal characteristics of an attenuation to determine the axial coordinate position. Measurements are taken along two axes sequentially in order to determine a Cartesian coordinate position. See, U.S. Pat. Nos. 4,642,423, 4,644,100, 4,645,870, 4,700,176, 4,746,914 and 4,791,416, Re. 33,151 incorporated herein by reference. U.S. Pat. No. 4,642,423, to Adler, incorporated herein by reference, addresses pseudo-planarization techniques for rectangular touchscreen surfaces formed by small solid angle sections of a sphere.

As shown in FIG. 1, the system transmits a short-time ultrasonic wave signal in the form of a burst by acoustic wave transmitting means 11 and 12, disperses the transmitted signal to the whole surface of a coordinate input range 15 through reflecting members 13 and 14, which act as acoustic wave dispersers. The system receives the signal by receiving means 18 and 19 through reflecting members 16 and 17, which act as acoustic wave condensers, and analyzes the received signal along the time base, to detect indicated coordinates.

A portion of the touchscreen system where the wedge type transducer is located on the surface of the panel is inevitably higher than the surface of the panel. As shown in FIG. 2, when a display is composed of a curved panel such as a typical cathode-ray tube, a space where a wedge-type transducer 23 can be located often appears between a curved panel 21 and a bezel 22 covering the periphery of the curved panel 21. When the display is composed of a flat panel, such as a liquid crystal display or a plasma display as shown in FIG. 3, however, there is no clearance between a panel 24 and a bezel 25 in the periphery of the surface of the panel 24 covered with the bezel 25, whereby there is no room for location of the wedge-type transducer. When a wedge-type transducer is employed, therefore, the ultrasonic type touch panel is not well adapted for use with a flat panel. Thus, the type of applicable displays and housing configurations that may be adapted are greatly restricted.

The known reflective arrays are generally formed of a glass frit that is silk-screened onto a soda-lime glass sheet, formed by a float process, and cured in an oven to form a chevron pattern of raised glass interruptions. These interruptions typically have heights or depths of order 1% of the acoustic wavelength, and therefore only partially reflect the acoustic energy. In order to provide equalized acoustic power at the receiving transducer, the spacing of the reflective elements may be decreased with increasing distance from the transmitting transducer, or the balance of acoustic transmissivity and reflectivity of the reflective elements may be altered, allowing increased reflectivity with increasing distance from the transmitting transducer. Because the touch sensor is generally placed in front of a display device, and because the reflective array is generally optically visible, the reflective arrays are generally placed at the periphery of the substrate, outside of the active sensing area, and are hidden and protected under a bezel.

In order to further reduce the number of transducers, folded acoustic paths may be employed. FIG. 11 of U.S. Pat. No. 4,700,176 teaches the use of a single transducer for both transmitting the wave and receiving the sensing wave, with a single reflective array employed to disperse and recombine the wave. Such systems therefore employ a reflective structure opposite the reflective array. Thus, the acoustic wave may be reflected 180° off an edge of the substrate or an array of reflectors parallel to the axis of the transmission reflective grating and reflected back through the substrate to the reflective array and retraces its path back to the transducer. The transducer, in this case, is time division multiplexed to act as transmitter and receiver, respectively, at appropriate time periods. A second transducer, reflective array and reflective edge are provided for an axis at right angles to allow determination of a coordinate of touch along perpendicular axes. A "triple transit" system, provides for a single transducer which produces a sensing wave for detecting touch on two orthogonal axes, which both produces and receives the wave from both axes. See, U.S. Pat. Nos. 5,072,427, 5,162,618, and 5,177,327, incorporated herein by reference. The vast majority of present commercial products are based on Rayleigh waves. Rayleigh waves maintain a useful power density at the touch surface due to the fact that they are bound to the touch surface. A Rayleigh wave is a wave having vertical and transverse wave components with substrate particles moving along an elliptical path in a vertical plane including the axis of wave propagation, and wave energy decreasing with increasing depth in the substrate. Both shear and pressure/tension stresses are associated with Rayleigh waves.

Mathematically, Rayleigh waves exist only in semi-infinite media. In realizable substrates of finite thickness, the resulting wave may be more precisely termed a quasi-Rayleigh wave. Here, it is understood that Rayleigh waves exist only in theory and therefore a reference thereto indicates a quasi-Rayleigh wave. For engineering purposes, it is sufficient for the substrate to be 3 or 4 Rayleigh wavelengths in thickness in order to support Rayleigh wave propagation over distances of interest to touchscreen design.

In addition to Rayleigh waves, acoustic waves that are sensitive to touches on the surface, i.e., a touch on the surface leads to a measurable attenuation of acoustic energy, include but are not limited to Lamb, Love, zeroth order horizontally polarized shear (ZOHPS), and higher order horizontally polarized shear (HOHPS). See, U.S. Pat. Nos. 5,591,945, 5,329,070, 5,260,521, 5,243,148, 5,177,327, 5,162,618 and 5,072,427, incorporated herein by reference.

Like Rayleigh waves, Love waves are "surface-bound waves", i.e. waves bound or guided by one surface and unaffected by the substrates other surface provided the substrate is sufficiently thick. In contrast to Rayleigh waves, particle motion for Love waves is horizontal, i.e. parallel to touch surface and perpendicular to the direction of propagation. Only shear stress is associated with a Love wave.

Another class of acoustic waves of possible interest in connection with acoustic touchscreens are plate waves. This includes the horizontally polarized shear plate waves of lowest (ZOHPS) and higher orders (HOHPS), as well as Lamb waves of various symmetries and orders.

It is known that arrays of reflective elements having a regular spacing or spacing increment can diffract or scatter incident radiation, including acoustic waves. The known Adler-type touchscreen design, discussed above, employs a reflective array to coherently reflect an acoustic wave at a predetermined angle. The touchscreen designs according to U.S. Pat. Nos. 5,072,427 and 5,591,945, expressly incorporated herein by reference, extend this principle, providing a reflective array which coherently reflects an acoustic wave at a predetermined angle on the surface while converting a wave mode of the wave. Thus, it is known that the interaction of an acoustic wave with a diffraction grating can convert wave energy between various wave modes.

The touches sensed by the acoustic waves may include a finger or stylus pressing against the surface directly or indirectly through a cover sheet. See, e.g., U.S. Pat. No. 5,451,723, incorporated herein by reference, which employs a shear mode wave acoustic sensor system and edge transducers. The use of wedge transducers, often used in Rayleigh wave acoustic touchsensors, makes mounting of a cover sheet on the front surface difficult, due to mechanical interference between the coversheet and the wedge transducers. As with LCD touchmonitor design, use of wedge transducers complicates mechanical design and may limit options.

One approach to address such mechanical interferences from wedge transducers is described in U.S. patent application Ser. No. 08/610,260, filed Mar. 4, 1996, expressly incorporated herein by reference. As disclosed herein, a wedge transducer may be mounted on a front surface bevel adjacent to the touch region, which recesses the wedge transducer behind the front surface of the touchscreen substrate, but incurs acoustic losses. Contrary to the needs of liquid crystal display (LCD) touchmonitor design, such designs typically add border width to the touchscreen.

Masao Takeuchi and Hiroshi Shimizu, "Theoretical analysis of grating couplers for surface acoustic waves", Journal of the Acoustic Society of Japan, 36(11):543–557 (Jun. 24, 1980), incorporated herein by reference, discloses a grating transducer and the theoretical framework of their operation. See also, Published research paper of Masao Takeuchi and Hiroshi Shimizu of Tohoku University on "Unidirectional excitation of plate waves in a periodic structure" (in Japanese) (1991). See, also J. Melngailis and R. C. Williamson, "Interaction of Surface Waves and Bulk Waves in Gratings: Phase shifts and Sharp Surface Wave/ Reflected Bulk Wave Resonances", Proc. 1978 IEEE Ultrasonics Symposium, p. 623; Herman A. Haus, Annalisa Lattes and John Melngailis, "Grating Coupling between Surface Acoustic Waves and Plate Modes", IEEE Transactions on Sonics and Ultrasonics, p. 258 (September, 1980).

In a wedge transducer, unconverted bulk wave from the piezoelectric transducer that is not coupled to, e.g., Rayleigh waves does not enter the touchscreen substrate and is dissipated in the wedge material. In contrast, in a surface grating arrangement, bulk wave energy from the piezo that is not converted to, e.g., Rayleigh waves at the grating will take the form of parasitic bulk or plate waves propagating in the substrate material itself.

As made clear from Takeuchi et al. (1980), a theoretical upper limit of conversion efficiency for incident bulk-wave energy to Rayleigh-wave energy is 81%, leaving a theoretical minimum of 19% of the bulk-wave energy in the form of parasitic waves Even this efficiency is difficult to achieve in practice; see discussion of "F factor" in Takeuchi et al. (1980). It is thus clear that a grating transducer has a significant disadvantage relative to wedge transducers: strong generation of parasitic waves. For typical applications of ultrasonic transducers, such as non-destructive testing, such strong generation of parasitic waves is often unacceptable. Even in touchscreens, the prospect of significant parasitic waves generated propagating parallel in the plane of the substrate to the desired wave would be considered troublesome. Similar considerations apply to the sensitivity of receive-mode grating transducers to parasitic waves.

It is known that undesired parasitic waves can be a problem for at least some examples of acoustic touchscreen design. For example, see FIGS. 13, 14 and 17, and associated text, of U.S. Pat. No. 5,260,521, the entirety of which is expressly incorporated herein by reference. Touch recognition algorithms in commercial touchscreen controllers require that the desired signal be free from interference from parasitic signals.

R. F. Humphryes and E. A. Ash, "Acoustic Bulk-surface-wave transducer," Electronics Letters (Volume 5 No. 9) May 1, 1969 includes discussion of a grating transducer that employs asymmetrical grating teeth as a means to construct a unidirectional transducer. This reference also considers a pair of gratings on opposing substrate surfaces as a means to transfer Rayleigh waves between surfaces.

U.S. Pat. No. 5,400,788, FIGS. 12, 13, and 14, the entirety of which is expressly incorporated herein by reference, discloses a transducer arrangement in which gratings are used to couple Rayleigh waves to bulk waves. Interdigital transducers on a piezoelectric substrate generate Rayleigh waves that are then converted via gratings to pressure bulk waves that are then coupled into an acoustic wave-guide (which optionally is also an optical fiber). The interdigital electrodes and the gratings form sections of circular arcs.

U.S. Pat. No. 5,673,041, "Reflective mode ultrasonic touch sensitive switch," the entirety of which is expressly incorporated herein by reference, discloses an ultrasonic touch sensor that makes use of a thickness mode resonance of a touch panel substrate. An array of transparent piezoelectric elements, formed for example of polyvinylidene fluoride (PVDF), is bonded to the backside of the substrate (e.g. glass). The impedance characteristics of the piezoelectric elements, which are coupled to the substrate's thickness resonance, are monitored by electronics. A finger touch absorbs acoustic energy, damps the thickness resonance and hence alters the Q (quality factor) of the resonant system, and thus changes the impedance characteristics of the piezo coupled to the thickness resonance. This scheme thus employs the known damping of acoustic waves by an absorptive object, and does not employ a scattering structure or grating.

DISCLOSURE OF INVENTION

The present invention provides a transducer system for an acoustic touchscreen in which an acoustically emissive element, e.g., a piezoelectric element, generates bulk waves in a medium, which then interact with a grating structure to produce a useful plate wave or surface-bound wave, e.g., a Rayleigh wave, Love wave or HOHPS wave. Thus, a bulk wave, which couples to a piezoelectric element, interacts with the grating structure and is converted to a wave mode which is constrained by one or more surfaces of the substrate and has appreciable energy at at least one surface. Using these general principles, a variety of touchscreen configurations are possible. Typically, bulk wave modes themselves are unsuitable for use in touchscreens, and must be converted to more useful wave modes.

According to the invention, the bulk wave interacts with a grating at the surface propagating at a non-zero angle with respect to the local area of the surface. Optionally the grating may have a significant component within the bulk of the substrate in addition to or instead of a surface grating structure. The grating itself comprises at least one scattering center capable of coupling acoustic wave modes; practically, efficient wave mode conversion occurs with a set of periodic perturbations, which may be linear, curved, dots, or other shapes. A linear grating, e.g., one in which the elements are disposed extending beyond the width of the incident acoustic beam, is considered a one dimensional scattering element, and will typically produce scattered acoustic waves slightly diverging along an axis. Elements which interact with a part of the acoustic wave, e.g., are point scattering centers or short elongated elements, may scatter to a number of different acoustic waves, each potentially having a different wave mode or axis of propagation. Elements which are curved or aligned along curved axes may act as acoustic lenses, converging or diverging the acoustic wave as compared to a linear grate of otherwise similar characteristics.

The inventors of the invention have found, that when bulk waves, which may be longitudinal waves (compression waves) and/or transversal waves (shear waves), are propagated through the substrate toward a periodic perturbation structure on a surface of the substrate, the bulk waves are converted into surface bound or plate waves by means of the periodic perturbation. The surface bound or plate waves may then be employed to detect with high precision a touch position (a contact position or an input position) in a touch-sensitive region of the panel, which, for example, may correspond to a display area of the panel, thus alleviating the need for a wedge-type transducer. In a typical embodiment, the waves are generated by a compression mode acoustic wave transducer on one surface of the substrate, which generates a bulk wave in the substrate, directed toward a grating or set of scattering elements. Surprisingly, while grating transducers themselves have significant coupling to parasitic waves in the substrate, the inventors have found parasitic-signal effects to be quite manageable for a complete touchscreen incorporating grating transducers.

Another aspect of the invention provides an acoustic transducer system, including Rayleigh-wave transducers, suitable for polymeric substrates. U.S. Pat. No. 5,162,618, Col. 5, lines 42–44 refers to a plastic substrate for a touchscreen using shear plate waves; no teaching is provided as to how Rayleigh waves might be generated in a plastic substrate. The wedge angle opposite the piezoelectric element of a wedge transducer is given by the following formula:

$$\cos(\theta) = V_P(\text{wedge})/V_R(\text{substrate})$$

For a given material the Rayleigh wave velocity, $V_R$, is typically about half the pressure wave velocity, $V_P$. To be able to design a wedge transducer, i.e. for $\cos(\theta)$ to be less than one, the pressure wave velocity in the wedge material must be less than about half the pressure wave velocity in the substrate. This can be done if the substrate material, e.g. glass, has a relatively fast velocity of sound and the wedge material, e.g. acrylic, has a relatively slow speed of sound. However, if the substrate is a polymer material and hence has a slow speed of sound, it is difficult to find an acceptable wedge material with the required much slower speed of sound. In order to make polymer touchscreen designs in which Rayleigh waves are generated and received on a polymer substrate practical, there is thus a need for an alternative to the wedge transducer. The present invention thus eliminates consideration of the refraction characteristics of a wedge material, using instead a diffraction principle to convert wave modes.

According to the present invention, the grating preferably takes advantage of coherent scattering of multiple scattering centers. Thus a grating may be an array having at least one significant Fourier component corresponding to desired Bragg diffractive coupling between the bulk wave and desired wave. The horizontal component of the wave vector of the bulk wave in this case couples to the wave vector of a plate or surface-bound wave. A grating may be provided as a surface structure, with the bulk wave incident on the grating at an angle inclined to the surface of the substrate. Alternately, the grating may be buried in the substrate or nonplanar. The basic principles of grating transducer operation are largely independent of the details of the grating structure, although asymmetry of grating structure may lead to directionality. The gratings may be formed of elements which present as grooves, ridges, deposited material, filled grooves, buried structures (acoustically reflective elements below the substrate surface), having various profiles, including rectangular, sinusoidal, sawtooth, and other symmetrical or asymmetrical shapes. In fact, for a molded grating transducer for a polymer substrate, the smooth edges of a sinusoidal grating are preferable. It is noted that, due to the symmetry and spacing of the elements, the function of the grating elements will be essentially the same for the fundamental frequency, although the grating will have different characteristics with respect to harmonics.

For the present purposes, a grating may be considered a region of a sensor subsystem in which the acoustic properties of the medium have been modulated in such a fashion to produce a distribution of scattering centers which has significant Fourier-transform amplitudes for one or more points in two-dimensional wave vector space. A grating having multiple acceptance angles has a significant two-dimensional Fourier-transform amplitude for two or more points in 2-D wave-vector space. The grating may be a planar grating or a bulk diffractive structure, formed, for example, by selectively depositing layers of grating material.

By coupling to multiple directions, some efficiency will be lost and more care may be needed to avoid parasitic signals; however, the reduced part count and the compactness and mechanical simplicity of the design may be advantageous under some circumstances. For example, a single receive transducer may receive both X and Y signals.

In some cases, it may be convenient for manufacturing purposes to fabricate reflective arrays or gratings on strips of material which are then bonded onto the rest of the substrate; see U.S. Pat. No. 4,746,914, column 9. Thus a bonded structure may be used for manufacturing convenience or packaging configuration.

The acoustically emissive or sensitive structure, which forms part of the acoustic transducer, is typically a piezo-electric element, but is not so limited. A transducer is a structure which converts energy from one form to another, and may be bidirectional. For example, electroacoustic transducers, optoacoustic transducers, magnetoacoustic transducers, acousto-acoustic transducers (converts energy between one acoustic wave mode and another), and thermoacoustic transducers, among others, are available.

A piezoelectric element is typically in the form of a thin rectangular slab having conductive portions serving as electrodes with a piezoelectric responsive material in between. When an oscillating voltage signal is applied to the electrodes, the resulting electric field within the piezoelectric material, via the piezoelectric effect, causes the element to vibrate, depending on the nature of the piezoelectric material, arrangement of the electrodes, and mechanical limitations or couplings. Conversely, if the element is subjected to mechanical oscillations, an oscillating voltage will appear on the electrodes.

There are several options regarding the mode of the piezoelectric element's mechanical oscillations. A common choice is the lowest-order compression-expansion oscillation with respect to the thin dimension of the element; such an element couples to bulk pressure waves or other acoustic modes with a significant longitudinal component. Another option is a lowest-order shear oscillation in which one electrode-bearing surface moves anti-parallel to the opposite face; such an element couples to bulk shear waves and other acoustic modes with shear components. The direction of shear motion can be designed to be any direction within the plane of the electrodes. More complex options are also possible. According to one aspect of the present invention, various sets of sensing waves propagating in the substrate may be distinguished according to their propagation mode by selective coupling to appropriate mode-sensitive transducers.

Typically, piezoelectric elements are designed to have a resonant frequency at the operating frequency for the desired mode of oscillation. For lowest order compression oscillation, the resonant frequency is the bulk pressure-wave velocity (in the piezoelectric material) divided by twice the piezoelectric element thickness so that the piezo transducer element is a half wavelength thick. Similarly, a lowest-order shear-mode piezoelectric element is half of a bulk-shear wavelength thick. As used in a touchscreen, the piezoelectric element is a damped mechanical oscillator due to coupling to acoustic waves in the substrate.

In one embodiment of the invention, the piezoelectric element has a linear series of band electrodes which are individually driven. When coupled to the substrate, for example to an edge of a slab of glass, with the series of electrodes disposed along the thickness of the glass, a phased array transducer is formed. In a simplest embodiment, the spacing of the electrodes is one-half of the desired bulk wavelength divided by the cosine of a desired angle of propagation, allowing alternating electrodes to be electrically parallel, and therefore forming a mode-selective two-electrode transducer, producing acoustic waves both diagonally upward and downward in the substrate. More generally, each electrode of the phased array may be excited or analyzed separately, allowing coupling with acoustic waves having a wavelength longer than double the inter-electrode spacing, which may allow directional selectivity.

The transmitting transducer is excited with a sine wave or pseudo sine wave tone burst at the desired frequency, from the controller. This burst typically has a power spectrum with a maximum at a nominal operating frequency. Normally, the sensor is tuned for use at a specific frequency or set of frequencies, and therefore this parameter is predetermined. See, U.S. Pat. Nos. 4,644,100, Re. 33,151, and 4,700,176, incorporated herein by reference.

The basic concept of a grating transducer is as follows. A piezoelectric element is bonded directly to the substrate and couples to bulk waves within the substrate. These bulk waves then couple, via a grating, to the desired acoustic mode for touchscreen operation. The desired acoustic mode may be a Rayleigh wave.

In contrast to wedge transducers, grating transducers require no wedge and hence have a reduced mechanical profile. This is particularly important for LCD touchmonitors.

The grating transducer is particularly advantageous because eliminates need for precise angular alignment of a wedge-transducer subassembly on the surface of the substrate. In a grating transducer, the angular alignment of the grating has similar tolerances. However such tolerances can easily be met by standard printing processes. Tolerances are much looser for the placement of the piezoelectric element on the substrate surface.

Gratings $5a'$, $5b'$, $8a'$, and $8b'$ of FIG. 4, which may be parallel or inclined to the y-axis, or curved elongated or interrupted elements, couple bulk waves and the surface bound or plate waves via the two dimensional Bragg scattering condition in the horizontal (x-y) plane defined by the local surface of the substrate. Let $\kappa$ represent the wave vector of the surface bound or plate wave. This is a vector in the X-Y plane as defined in FIG. 4 whose direction is the direction of propagation of the acoustic wave and whose magnitude is $2\pi/\lambda$, where $\lambda$ is the wavelength of the surface bound or plate wave. Let $(\kappa_B)\|$ represent the horizontal projection, i.e. the x and y components, of the wave vector of the bulk wave. Let $\theta_B$ be defined as the angle between $\kappa$ and $(\kappa_B)\|$, with $\theta_{BT}$ being the angle for conversion from bulk to surface or plate wave, and $\theta_{BR}$ being the angle for conversion from surface or plate wave to bulk wave, provided with different notation to denote that the coupled bulk wave modes may differ, and therefore the respective scattering angles may differ. Let $\kappa_B$ be a significant two-dimensional Fourier component of the grating. The two-dimensional Bragg scattering condition is met if the following equation is satisfied:

$$\pm \kappa_B = \kappa - (\kappa_B)\|$$

There are many special cases to this fundamental two-dimensional Bragg scattering condition. Some examples are given below.

In the special case that $\kappa$ and $(\kappa_B)\|$ are parallel, i.e., $\theta_E 0°$, and the grating is a periodic structure of linear grating elements perpendicular to $\kappa$ with spacing p, then the above relation reduces to the following scalar condition where n is an integer:

$$2\pi n/p = \kappa - \kappa_B \sin \theta_B$$

Furthermore, if the desired surface bound wave or plate wave is a Rayleigh wave of wavelength $\lambda_R$ (and the bulk wave wavelength is $\lambda_B$), this relation further reduces to the following equation $$\theta_B = \text{Arcsin} (\lambda_B/\lambda_R + n\lambda_B/p)(n = \ldots -3, -2, -1, 0, 1, 2, 3, \ldots) \quad (1a)$$

The internal angle $\theta_B$ in equation 1a can generally be selected from the range (in radians) of $-\pi/2 < \theta_B < \pi/2$, preferably $-3\pi/8 \leq \theta_B \leq 3\pi/8$, and more preferably $-\pi/4 < \theta_B < \pi/4$.

The wave employed for sensing touch may be any acoustic wave which is detectably perturbed by a touch on a surface of a substrate. Many options exist for the choice of surface bound or plate wave modes. Rayleigh waves have excellent touch sensitivity and are inherently confined to a thin volume close to the touch surface even for a substrate of an arbitrarily large thickness. Horizontally polarized shear waves have the advantage that they weakly couple to liquid and gel-like contaminants such as water and silicone-rubber seals. A non-homogenous substrate may, in addition to supporting propagation of other types of waves, be particularly adapted to support propagation of horizontally polarized shear waves having asymmetric surface power density, including Love waves, which are horizontally polarized shear waves trapped near the touch surface like Rayleigh waves. Lamb waves in a sufficiently thin substrate provide yet another option for the choice of acoustic wave mode. Various engineering trade-offs are involved in the optimal choice of acoustic mode for a given application.

In this context, Love waves may be supported by a top substrate portion having a lower phase velocity interfaced with a lower substrate portion having a higher phase velocity. Similar types of waves, generally classified as asymmetric horizontally polarized shear waves, may be supported by vertical phase velocity gradients of a more complex nature. A sandwich of a slow-velocity layer on a fast-velocity layer on an acoustically absorptive layer may support Love waves and simultaneously filter out parasitic plate waves. Thus, the substrate may comprise layers having differing acoustic propagation properties and/or acoustic interfaces.

The substrate may be formed as a flat plate with a rectangular shape or a non-rectangular shape such as a hexagonal plate. Alternatively the substrate may be curved along one or both axes as a cylindrical, spherical or ellipsoidal surface or section surface, or may have other configurations. Large solid angle spherical, and complete cylindrical substrates are possible. For example, a polygonal touch sensor may be provided with reflective arrays on each side and transducers at each vertex. This invention is not limited to standard rectangular sensor geometry.

It is noted that, for the purposes of this application, the substrate need not be a single monolithic structure, but rather an acoustically coupled set of elements which may be homogeneous or inhomogeneous. The acoustic path from the transmit transducer to the receive transducer may optionally pass through regions of the substrate that were bonded together as part of the fabrication process.

It is noted that, according to the concepts set forth in co-pending U.S. patent application Ser. No. 08/615,716, filed Aug. 12, 1996, expressly incorporated herein by reference, low curvature of the panel is not required, and in fact the present grating transducer may be applied at a large number of different acoustic touch-input sensing geometries, including grossly non-planar surfaces. U.S. patent application Ser. No. 08/615,716 also encompasses the use and analysis of multiple and/or redundant sensing waves.

A large substrate may also be employed in, e.g., a large white board application, in which the substrate is touch sensitive over a large area. Acoustic sensors of the Adler type have been considered for use in electronic white boards; see FIG. 10 and associated text in E.P. Application 94119257.7, Seiko Epson. In a white board application, the substrate need not be transparent, and therefore may be formed of an opaque material such as aluminum. Advantageously, aluminum and some other metals may be coated with an enamel with a relatively slow acoustic phase propagation velocity, thus supporting a Love wave with high touch sensitivity (relative to horizontal shear plate-wave modes) on the front surface.

Suitable glasses for forming the substrate include soda lime glass; boron-containing glass, e.g., borosilicate glass; barium, strontium or lead-containing glass, and crown glass. See for example U.S. patent application Ser. No. 08/904,670 of Tsumura and Kent. Other materials having acceptable acoustic losses may also be employed, including but not limited to aluminum and steel. Under certain conditions, suitable substrates may also be formed of a polymer, e.g., Styron®, a low-acoustic-loss polymer from Dow Chemical. Suitable substrates may also be formed from substrates having inhomogeneous acoustic properties, for example a laminate. The laminate may advantageously support Love wave propagation with acoustic wave energy concentrated on the front surface, for example a borosilicate glass or Schott B270 glass-soda lime glass laminate or enamel on aluminum.

Thus, one touch type coordinate input device according to the present invention comprises a propagation medium having a surface on which surface bound or plate waves can be propagated, transmitting means for propagating bulk waves in an oblique direction toward the surface of the propagation medium from the lowermost part of the propagation medium and producing the surface bound or plate waves by means of periodic perturbation, a display area formed on the surface of the propagation medium and being touchable, reflecting means provided in both side parts opposite to each other in the periphery of the display area and for propagating the surface bound or plate waves from the transmitting means over the whole of the display area from one of both the side parts as well as focusing or converging the surface bound or plate waves propagated in the other side part, and receiving means for converting the focused surface bound or plate waves into bulk waves by means of a periodic perturbation, propagating the bulk waves in an oblique direction toward the lowermost part of the propagation medium and receiving the propagated bulk waves.

In some embodiments according to the present invention, the propagation medium is composed of a flat panel or a low-curvature panel. Further, the transmitting means may comprise first piezoelectric means disposed in the lowermost part of a first corner portion of the propagation medium and for propagating bulk waves in an oblique direction toward the surface of the propagation medium in response to an electric signal and first grating means for converting the bulk waves from the first piezoelectric means into surface waves on the surface of the propagation medium, and the receiving means may comprise second grating means for converting the surface waves into bulk waves on the surface of the propagation medium and for propagating the bulk waves in an oblique direction toward the lowermost part of a second corner portion of the propagation medium and second piezoelectric means for receiving the bulk waves obtained upon conversion by the second grating means in the lowermost part of the second corner portion and producing an electric signal.

One embodiment of the invention provides an Adler-type touchscreen system which employs grating transducers to couple the piezoelectric elements to the sensing wave in the substrate. The touchscreen thus provides a coordinate input device system comprising a panel having a laterally symmetrical display area on which ultrasonic surface bound or plate waves can be propagated. In a typical four transducer system, two pairs of transducers are provided respectively for the X and Y axes. For each transducer, an inclined surface is provided at a corner portion of the panel, with a piezoelectric transducer disposed on the inclined surface. The piezoelectric element couples bulk waves propagating along an oblique axis with respect to a transmitting perturbation region in the periphery of the display area, at which a grating structure is disposed. The grating couples the bulk waves with surface bound or plate waves, thus allowing a bulk wave transducer to interact with the surface bound or plate waves. These surface bound or plate waves travel along an axis on which a reflecting array (reflecting grating) is provided near a peripheral edge of the panel. The elements of the reflective array each couple part of the surface bound or plate waves with a sensing wave traveling across the panel, and transmit part to an adjacent element, thus coupling a dispersed sensing wave from the entire touch sensitive region to a narrow acoustic beam which couples to the transducer. Thus, each transducer may either transmit or receive an acoustic wave, symmetrically. The two pairs are disposed at right angles to define a coordinate system. It is noted that the grating may provide a focusing function to compensate for spreading of the acoustic beam.

The acoustic path may also encounter a reflective boundary between scatterings off of the transmit and receive arrays. The reflective boundary may utilize coherent scattering from a superposition of scattering centers, and if so can be designed using similar principles as for reflective arrays that follow segments of acoustic paths. Note, however, that for reflective boundaries, it may be advantageous to use reflective elements that scatter more strongly. In accordance with the present invention, it is understood that these reflective boundaries may have useful significant Fourier component which correspond to a reflection of a wave, with or without change in mode, in the same plane, or may correspond to a conversion of mode from a wave, e.g., traveling in the plane of the surface, into a bulk wave directed at an angle inclined to the surface.

Engineering care may sometimes be required in array design to minimize creation of undesired parasitic acoustic paths which can result in signal artifacts. When using grating transducers, these parasitic paths must be considered in three dimensions.

The present inventors have found that, despite the generation of significant parasitic acoustic waves along the axis of the piezoelectric transducer, that workable embodiments may be produced. In an Adler-type touchscreen, the acoustic wave interacts with acoustic reflective arrays. The reflective arrays serve as narrow band filters for both wavelength and angle of propagation. Thus, a reflective array has a high directional sensitivity, which in conjunction with the transducer's directional sensitivity, serves to limit the angular acceptance of the system. Thus, in systems where bulk wave parasitics are of relatively low energy, stray wave energy rarely causes substantial interference in the received electronic signal. Assuming that direct paths of parasitic waves are unavailable or outside a useful time window, and reflected paths which would be within the time window are attenuated, extraordinary efforts to block parasitics are not necessary. In the event that an interfering parasitic path does prove problematic, typically a small change in touch sensor geometry may eliminate the problem.

Where bulk wave parasitics are present at high amplitude, parasitic attenuation design considerations may be important. When using a grating to interconvert wave modes, at most 81% of the incident acoustic wave energy from the bulk wave is coupled to a particular desired acoustic wave mode. Thus, at least 19% of incident wave energy is reflected or scattered as parasitic wave energy, often traveling parallel to the desired wave. According to the present invention, therefore, the desired wave may be selectively scattered in along a different axis than reflected or scattered parasitic waves, and/or the system provided with one or more mechanical filters, such as the reflective arrays or mode selective filters, or electronic filters, such as time-gating systems, to reduce the interference of parasitic waves. Another particularly advantageous technique which reduces the effects of parasitic waves is to employ a shear wave mode piezoelectric element which generates a shear mode bulk wave at an appropriate acute angle with respect to the desired surface bound or plate wave. This embodiment provides at least two advantages. First, and reflected wave energy propagates antiparallel to the desired wave mode, and is thus more easily attenuated by absorbing material applied to a surface along its path. Second, such a shear mode bulk wave couples only to the desired surface bound or plate wave, making the "F" factor according to Takeuchi et al. (1980) equal to one, implying efficient wave conversion.

The touchscreen is typically associated with a control system, having a number of functions. First, an electronic signal is generated, which excites the transducer to generate an acoustic wave which subsequently forms the sets of waves. A transducer then receives the sets of waves, and transduces them to an electrical signal. The electrical signal is received, retaining significant information with a relatively high data rate in a low level control system. In many embodiments, it is not necessary to capture phase information contained in the received signals. However, in some instances, it may be advantageous to do so. An intermediate level control system, often combined structurally with the low level control, processes the received data, seeking to identify and characterize perturbations. For example, in one embodiment, the intermediate level control filters the signal, performs baseline correction, and determines a relation of the signal to a threshold, and gates the signal to eliminate signal representing parasitic acoustic paths having too short or too long an acoustic delay. A high level control analyzes the signal perturbations and outputs a touch position. The control system as a whole therefore has the functions of exciting an acoustic wave, receiving portions of the acoustic wave bearing touch information as a perturbation, and analyzing the received portions to extract characteristics of the touch, e.g., position.

The scope of the present invention includes embodiments where one or more sensor subsystems are of the positive-signal type. Here "positive-signal" refers to the use of desired acoustic paths for which a touch induces a mode conversion required to complete the acoustic path, or produces a wave shifted in phase from the originating wave. Hence the signal perturbation is the generation of a signal amplitude at a delay time for which the previous signal amplitude was small or zero. See, co-pending U.S. patent application Ser. No. 08/615,716, filed Aug. 12, 1996.

The excitation function may be a series of pulses or shaped pulses are emitted in a defined pattern, having substantial power spectrum density at a nominal operating frequency of frequencies. Because this pulse is of limited duration, it has a finite band width. For example, Elo TouchSystems manufactures a controller which can excite 5.53 MHz tone bursts with durations in the range of 6 to 42 oscillations, resulting in a broad frequency band excitation, due to the finite excitation duration, as compared to, for example, the bandwidth of the reflective arrays. This electronic pulse train typically drives a transmit piezoelectric element. Where high flexibility of control over the excitation burst is desired, a direct digital synthesizer, such as the Analog Devices AD9850, may be employed.

While systems according to the present invention have been constructed without substantial interference from parasitic signals, some configurations may allow parasitic signals of limited duration to interfere with the desired signal. In those cases, it may be advantageous to provide one or more partially redundant sensor subsystems, which have different parasitic signal sensitivities. Thus, where a signal or a portion thereof from one transducer subsystem becomes unusable, a signal from another transducer subsystem may be processed to nevertheless allow determination of touch position. Therefore, according to this embodiment of the invention, an acoustic signal perturbation may be sensed by three or more acoustic transducer subsystems with differing sensitivity to parasitic or potentially parasitic signals. In addition, where parasitic signals do not interfere, the additional information may be used to provide further information and functionality, including anti-shadowing algorithm processing and multiple touch sensing.

Therefore, it is an object of the invention to provide an acoustic touch sensing device and method employing a substrate with a surface and an acoustic wave transducer for transducing a bulk wave in the substrate, propagating through the substrate along an axis intersecting the surface, wherein energy of the bulk wave is coupled to a wave having a converted wave mode with appreciable energy at the surface and propagating along the surface. A perturbation of the converted wave mode is detected. The acoustic wave mode coupler is, e.g., an acoustically diffractive element or set of elements. Typically, a system will include means for detecting a perturbation of the energy of the converted wave.

It is another object of the invention to provide an acoustic touchscreen, comprising a propagation medium having a surface for propagation of an acoustic wave along the surface, an emitting element for generating a bulk wave in the propagation medium, a first mode converter for producing the acoustic wave from the bulk wave, a second mode converter for receiving the acoustic wave from the first mode converter and producing a corresponding bulk wave, and a receiving element for receiving the bulk wave from the second mode converter, wherein at least one of the mode converters comprises a set of at least one wave scattering element or a diffractive wave mode coupling structure.

It is a further object according to the present invention to provide a substrate for an acoustic sensing device, having a central region, and a pair of surfaces, comprising an acoustic transducer, coupled to the substrate, to produce a bulk wave therein, having an axis of propagation intersecting at least one of the surfaces; a set of at least one scattering element, formed proximate to one of the surfaces, adapted to convert acoustic wave energy of the bulk wave to a coherent wave having appreciable energy at one of the surfaces; and means for reflecting portions of the converted acoustic wave energy through the central region. The acoustic wave from the reflecting means is spatially dispersed.

It is also an object of the invention to provide a system wherein the acoustic wave source comprises means for propagating bulk waves in an oblique direction toward the surface of the substrate.

It is a further object of the invention to provide a system wherein the bulk wave is coupled to another wave mode by interaction with at least one scattering center on or in the substrate. The scattering center may be arranged as a set providing a periodic perturbation of the substrate or as a grating structure.

In accordance with the present invention, wedge transducers may be eliminated from acoustic touchscreen designs or relocated, potentially providing improved front surface clearance and improved environmental resistance. The elimination of a requirement of a wedge having a relatively low acoustic propagation velocity as compared to the substrate allows use of slow acoustic propagation velocity substrates, such as plastics.

It is another object according to the present invention to provide an acoustic touchscreen system having transducers have low alignment sensitivity and potentially have reduced manufacturing costs.

It is still another object according to the present invention to provide transducers which produce converging acoustic waves or provide other focusing or acoustic-lens functionality.

These and other objects will become apparent. For a full understanding of the present invention, reference should now be made to the following detailed description of the preferred embodiments of the invention as illustrated in the accompanying drawings.

BRIEF DESCRIPTION OF DRAWINGS

The preferred embodiments of the invention will be shown by way of drawings of the Figures, in which.

MODES FOR CARRYING OUT THE INVENTION

Figure 1:
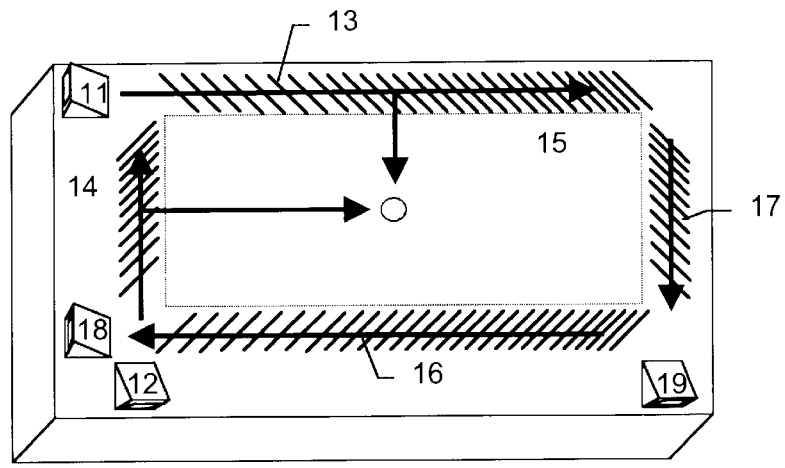
FIG. 1 is a schematic perspective view showing a prior art acoustic touchscreen device.
Figure 2:
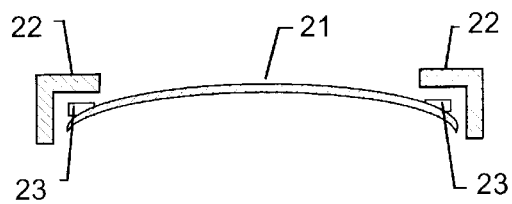
FIG. 2 is a schematic cross-sectional view showing the relationship between a curved panel and a bezel.
Figure 3:
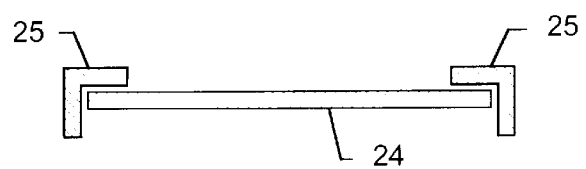
FIG. 3 is a schematic cross-sectional view showing the relationship between a flat panel and a bezel.
Figure 4:
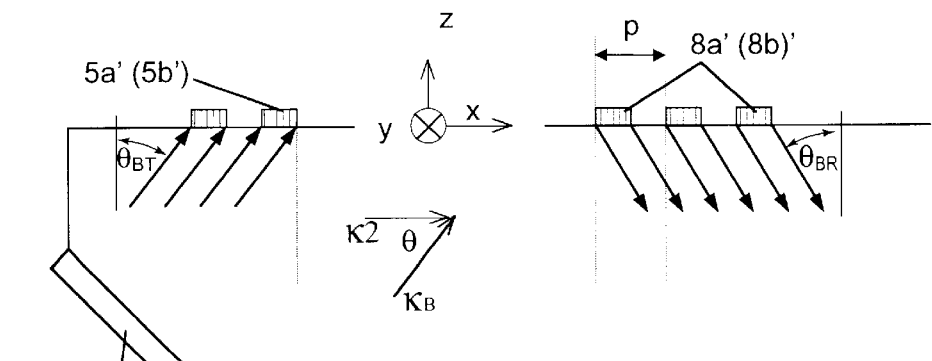
FIG. 4 is a schematic view for explaining a converting mechanism between surface bound or plate waves and bulk waves.

The preferred embodiments of the invention will now be described with respect to the drawings. Like features of the drawings are indicated with the same reference numerals. The well known principle of reciprocity of acoustic devices implies that nominal transmit and receive transducers may perform either function. Therefore, in the below described embodiments, it should be understood that the acoustic transducers may transmit or receive acoustic signals, or both.

EXAMPLE 1

Figure 5:
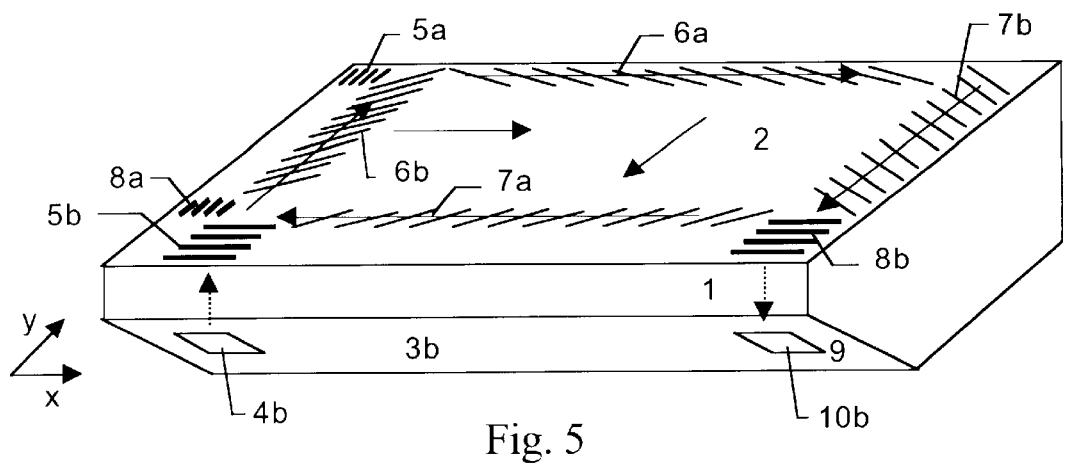
FIGS. 5 and 6 are front and side schematic perspective views, respectively, showing one embodiment of a coordinate input device according to the present invention.
Figure 6:
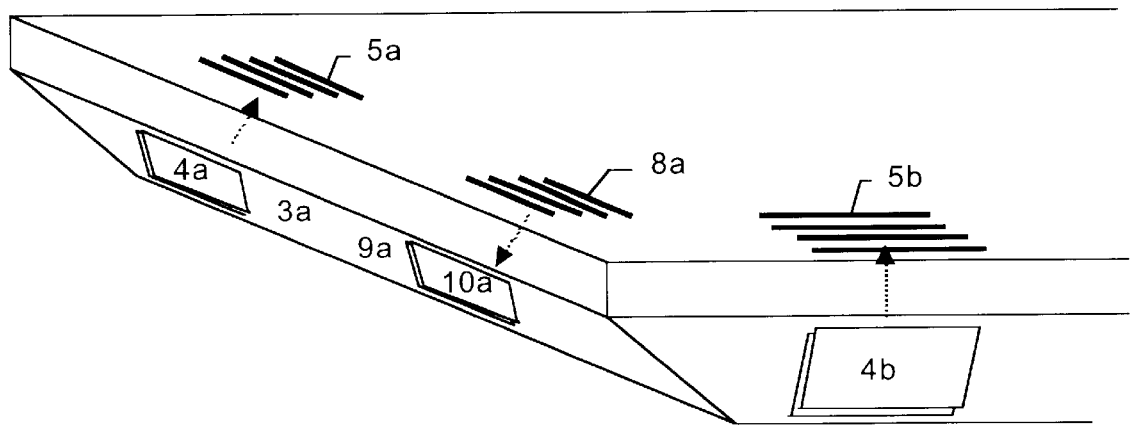

FIG. 5 is a schematic perspective view showing one embodiment of a coordinate input device according to the present invention. FIG. 6 is a schematic perspective view for illustrating a perturbation region or diffraction region by means of grating.

The coordinate input device in this embodiment comprises a propagation medium 1 having a display area 2 adapted to be touched, which is laterally symmetrical in the directions of the X-axis and the Y-axis formed on its surface, and having a surface on which surface bound or plate waves can be propagated. The medium 1 is coupled to a transmitting transducer for propagating bulk waves (which may be pressure mode or shear mode) in an oblique direction toward the surface of the propagation medium 1 from the lowermost part of the propagation medium 1 and producing surface bound or plate waves in the directions of the X-axis and the Y-axis by means of a perturbation. The X-axis transmitting means includes the piezoelectric transducer 4a, mounted on inclined surface 3a, and grating 5a formed on the medium 1, and the Y-axis transmitting means includes piezoelectric transducer 4b formed on inclined surface 3b of medium 1 and grating 4b. In this embodiment, the propagation medium 1 is composed of an isotropic flat panel formed of soda-lime glass having beveled edges.

The above-mentioned transmitting means 3a, 4a, 5a and 3b, 4b, 5b respectively comprise inclined surfaces 3a and 3b formed in adjacent first corner portions corresponding to transmitting perturbation regions in the directions of the X-axis and the Y-axis in the lowermost part of the propagation medium 1, piezoelectric transducers of the first piezoelectric means 4a and 4b disposed in the inclined surfaces and for emitting bulk waves in an oblique direction toward transmitting perturbation regions on the surface of the propagation medium 1 in response to an electric signal, and first gratings 5a and 5b for converting the bulk waves propagated in the propagation medium from the piezoelectric transducers into surface waves in the transmitting perturbation regions on the surface of the propagation medium 1. Further, planes of orthogonal projection from the inclined surfaces 3a and 3b in the original regions cross each other in perturbation regions in the periphery of the display area 2 on the surface of the propagation medium 1 (a transmitting perturbation region in the X-axis and a transmitting perturbation region in the Y-axis), and the gratings 5a and 5b are respectively disposed in the perturbation regions. The gratings of the first converting means 5a and 5b comprise a plurality of linear gratings (grids or lattices) extending in the perpendicular direction with respect to travel direction of the bulk waves propagated from the piezoelectric transducers 4a, 4b in almost parallel with each other and disposed periodically, and thereby the bulk waves and the surface waves are convertible into each other.

The surface bound or plate waves from the transmitting means 3a, 4a, 5a in the direction of the X-axis and the transmitting means 3b, 4b, 5b in the direction of the Y-axis are propagated in the directions of the Y-axis and the X-axis over the whole of the display area 2 by reflecting means which comprises first reflecting arrays 6a and 6b and second reflecting arrays 7a and 7b, and the propagated surface bound or plate waves are directed or converged in the directions of the X-axis and the Y-axis, and are received by receiving means 8a, 9a, 10a and 8b, 9b, 10b, respectively.

More specifically, the first X-axis reflecting array 6a for propagating the surface bound or plate waves from the transmitting means 3a, 4a, 5a in the direction of the Y-axis from the direction of the X-axis with the periodic transmitting perturbation region as its point of origin is formed in one side part extending in the direction of the X-axis in the periphery of the display area 2, and the second X-axis reflecting array 7a for reflecting the surface bound or plate waves reflected in the direction of the Y-axis by the first X-axis reflecting array 6a and directing the reflected surface bound or plate waves at a receiving perturbation region in the direction of the X-axis is formed in the other side part opposite to the first side part in the periphery of the display area 2. Further, the first Y-axis reflecting array 6b for propagating the surface bound or plate waves from the transmitting means 3b, 4b, 5b in the direction of the X-axis from the direction of the Y-axis with the transmitting perturbation region as its point of origin is formed in one side part extending in the direction of the Y-axis in the periphery of the display area 2, and the second Y-axis reflecting array 7b for reflecting the surface bound or plate waves reflected in the direction of the X-axis by the first Y-axis reflecting array 6b and directing the reflected surface bound or plate waves at a receiving perturbation region in the direction of the Y-axis is formed in the other side part opposite to the above-mentioned side part in the periphery of the display area 2. Each of the reflecting arrays can transmit a part of the surface bound or plate waves and can reflect the same. The reflecting arrays 6a, 6b, 7a and 7b make it possible to propagate the surface bound or plate waves from the transmitting means in the direction of the X-axis and the transmitting means in the direction of the Y-axis over the whole of the display area 2 as well as direct the surface bound or plate waves propagated in the display area 2 at the respective receiving perturbation regions of the X and Y axes.

The receiving means 8a,9a, 10a and 8b, 9b, 10b convert the surface bound or plate waves, which have been propagated and converged in the display area 2, into bulk waves, and propagate the bulk waves in an oblique direction toward the lowermost part of the propagation medium 1 to receive the propagated bulk waves. Specifically, the receiving means comprise the gratings of the second converting means 8a and 8b disposed in the receiving perturbation regions adjacent to the second reflecting arrays 7a and 7b and for converting the surface bound or plate waves into bulk waves as well as propagating the bulk waves in an oblique direction, toward the lowermost part of the propagation medium 1, the inclined surfaces 9a and 9b formed in final regions of second corner portions corresponding to refracted projection regions by means of the gratings 8a and 8b in the lowermost part of the propagation medium 1, and piezoelectric transducers of the second piezoelectric means 10a and 10b disposed on the inclined surfaces and for receiving the bulk waves obtained upon conversion by the gratings 8a and 8b and generating an electric signal. The gratings of the second converting means 8a and 8b comprise, in the same manner as the gratings of the first converting means 5a and 5b, a plurality of linear gratings extending and disposed periodically and parallel in the perpendicular direction with respect to the travel direction of the bulk waves toward the piezoelectric transducers 10a and 10b.

The signal received by the piezoelectric transducers 10a and 10b is fed to detecting means (not shown) for analyzing the signal. In the detecting means, a disturbed component caused by touching of the display area 2 in the received signal, together with a corresponding time delay, is detected to detect a touching position or a touching region in the display area 2.

The bulk waves produced by the piezoelectric transducers 4a and 4b travel straight in the propagation medium 1, are obliquely incident on the interfaces of the propagation medium 1 and the transmitting perturbation regions, including gratings 5a and 5b, and are converted into surface bound or plate waves. The surface bound or plate waves propagated in the propagation medium 1 are diffracted into an oblique direction at the receiving perturbation regions, including gratings 8a and 8b, to be converted into bulk waves.

In such a coordinate input device, when an electric signal is fed to the piezoelectric transducers 4a and 4b, bulk waves are produced by the vibration of the piezoelectric transducers, and the bulk waves can be converted into surface bound or plate waves by the gratings 5a and 5b in the perturbation regions, so that the surface bound or plate waves can be propagated in the directions of the X-axis and the Y-axis through a plurality of paths (routes) in the display area 2 by the first reflecting means. When the display area 2 is touched by a finger or the like, therefore, the surface bound or plate waves are disturbed, and the surface bound or plate waves including disturbed components are directed or converged at the receiving perturbation regions by the second reflecting means. In the receiving regions, the surface bound or plate waves are converted into bulk waves by the gratings 8a and 8b, and the bulk waves are converted into an electric signal by the piezoelectric transducer 10a or 10b.

The gratings 5a, 5b, 8a and 8b for perturbation are thin, for example much less than an acoustic wavelength in height, so that the surface of the propagation medium can be relatively smooth compared to the mechanical profile of a wedge type transducer. Therefore, a touch-panel according to the present invention may be mounted behind a bezel with relatively low clearance.

Although the species of the propagation medium is not particularly limited, a panel in which surface bound or plate waves and particularly, ultrasonic surface bound or plate waves can be propagated is employed. A display area of the panel includes a touchable range (that is, a coordinate input range), and is generally formed into a laterally symmetrical shape as in the above-mentioned embodiment and particularly, a linearly symmetrical shape (particularly, a rectangular shape). The propagation medium constructed as a panel generally has transparency in order to make a liquid crystal screen, vacuum fluorescent, other flat panel display or the like visible. A preferred propagation medium is transparent and isotropic. The periphery of the display area, i.e., an end of the propagation medium such as the panel, can be generally covered with a bezel.

The inclined surface may be respectively formed in portions corresponding to an original region and a final region in the lowermost part of the propagation medium, or may be formed in the whole of corner portions between side surfaces and the bottom surface of the propagation medium such as the panel, as shown in FIG. 5.

The grating perturbation cycle, i.e., the interval or pitch of the gratings, in the transmitting or receiving perturbation regions may be selected within a range of, for instance, about 0.01 to 10 mm, preferably about 0.1 to 5 mm and more preferably about 0.3 to 1 mm, according to the wavelength of the bulk waves in the propagation medium and the wavelength of the surface waves in the surface of the propagation medium. The number of gratings and width thereof are not particularly limited, and, for example, the number of gratings is about 3 to 10, and the width, i.e., the substrate border region dimension, of the grating is typically about 0.01 to 10 mm.

The thickness (height) of the grating may be selected within a range of not greater than 5 mm, for example, about 0.01 to 3 mm, preferably about 0.1 to 3 mm and more preferably about 0.1 to 1 mm. The gratings may be formed by screen printing or other technology. The gratings may also be formed by etching, cutting or grinding, or ablation, or by other material removal methods. Gratings may also be formed by molding, hot stamping, or by post-fabrication modification of the properties of the substrate. The grating elements may vary in height and/or width, in similar manner to the elements of a reflective array, to balance reflectivity and transparency over the grating. For example, a monotonic height modulated grating may be used to provide unidirectional directionality to the grating.

The reflecting means need not be composed of a reflecting array, and can be composed of one or a plurality of reflecting members capable of transmitting a part of the surface bound or plate waves. The reflecting array constituting the reflecting means may be an aggregate of reflecting array elements (a group of reflecting arrays) formed as projections, e.g., for example, formed of glass, ceramics or metal, and/or grooves on the surface of the propagation medium. The reflecting array elements are generally formed parallel to each other, and the angle of the reflecting member or each of the reflecting array elements is generally approximately 45° to the X-axis or the Y-axis in order to propagate the surface bound or plate waves in the directions of the X-axis and the Y-axis. As known from U.S. Pat. No. 5,591,945, expressly incorporated herein by reference, the reflective array elements may also be inclined at other angles to produce non-rectangular wavepaths for the touchscreen or to effect a mode-conversion between the incident wave and the reflected wave, for example, quasi-Rayleigh to higher order horizontally polarized shear waves (HOHPS) or Love waves.

The grating elements may be formed in a common process with the reflective array elements, e.g., screen printing. This commonality may reduce manufacturing cost.

The touchscreen system according to the present invention typically employs an electronic control system (not shown in the drawings), which generates the sensing acoustic wave and determines perturbations indicative of touch position. The electronic control, in turn, interfaces with a computer system (not shown in the drawings), for example a personal computer, embedded system, kiosk or user terminal as a human interface device. The computer system may therefore be of any suitable type, and for example may include a display device, audio input and/or output capability, keyboard, electronic camera, other pointing input device, or the like. The computer system operates using custom software, but more typically using a standard operating system such as Microsoft Windows (e.g., 3.1, 3.11, WFW, CE, NT, 95, 98, etc., or other operating system which conforms to a set, subset or superset of Windows Application Program Interfaces or APIs), Macintosh operating system, UNIX variants, or the like. The touchscreen may thus be employed as a primary or secondary pointing device for a graphic user interface system to receive user input. The touchscreen controller and computer system may also be integrated, for example in an embedded system.

A touch type coordinate input device according to the present invention can not only be suitably used for a display having a curved surface, such as a cathode ray tube, and also a flat panel display, for example, a liquid crystal display and a plasma display.

EXAMPLE 2

Touchscreens incorporating grating transducers were designed, assembled, and tested. Grating transducer touchscreens were produced that were fully functional and had production quality signals.

Only small relative amplitude parasitic signals were observed. These parasitic signals were outside the time period of the desired signal for touchscreen operation. These parasitic signals did not disrupt touchscreen system operation and can be further reduced either with time gating in the controller electronics or by including acoustic dampers on the touchscreen outside of the touch region and reflective arrays. Despite significant parasitic wave generation by the grating transducers, parasitic signals from the receive transducers are not an obstacle to the functioning of acoustic touchscreens with grating transducers.

The dimensions of the glass substrate were about 272.5 mm×348.7 mm×3 mm. The glass substrate was provided with a 45° bevel on the underside for mounting piezoelectric elements for $\theta_B$=45° grating transducers. That is the normal to the piezoelectric element forms an angle, $\theta_B$, of 45° with respect to the vertical direction. Reflective arrays of 14 mm width were printed on the glass. The rectangular region of clear glass inside the arrays has dimensions of about 234.6 mm×310.8 mm. This provides an active touch area with a diagonal dimension is excess of 15 inches.

With the multiple-pass printing of glass frit described above, four gratings each about 40 micron height were provided at the four transducer locations. Wrap-around piezoelectric transducer elements 4a, 4b, 10a and 10b were bonded on the beveled surfaces 3a, 3b. See FIGS. 5 and 6. Wire cables (not shown in FIGS. 5 and 6) were respectively connected by soldering to electrodes of the respective piezoelectric transducers 4a, 4b, 10a and 10b. The wire cables were connected to a controller through a connector. An ultrasonic type controller commercially available (1055E101 manufactured by Touch Panel Systems Co., Ltd., Japan ("TPS")) was used as the controller. A personal computer with appropriate software was connected to the controller. Suitable acoustic touchscreen performance was observed.

To make comparisons, wedge transducers were temporarily placed immediately in front of the grating transducers 5a, 5b, 8a, 8b. The grating transducers gave touchscreen signals (for signal paths with two transducers) roughly 10 dB lower. While the grating transducer design and fabrication were not optimized, the grating transducers demonstrated efficiencies that are quite sufficient to be useful for many product designs.

Figure 7:
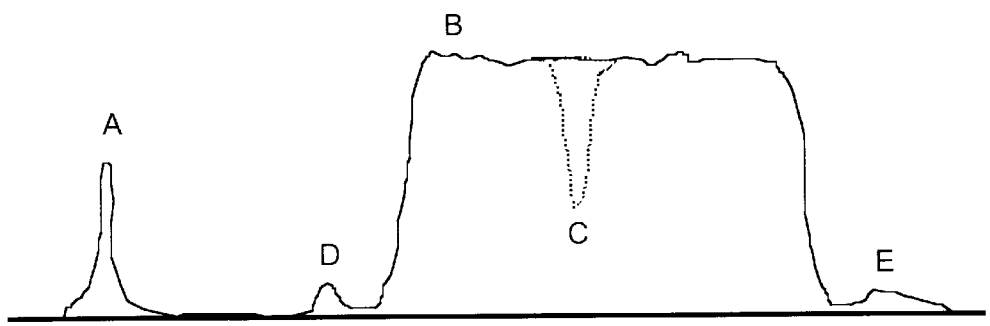
FIG. 7 shows a detected received acoustic waveform with a touch-induced perturbation.

Furthermore, signal waveforms were observed. A representation of a signal from a grating-transducer touchscreen is shown in FIG. 7.

The peak labeled A is an artifact of the experimental set up. Cross talk from burst and receive circuits result in an attenuated burst signal appearing in the receive signal. This provides a convenient t=0 marker in the received signal.

B labels the desired touchscreen signal of duration ≈190 microseconds and starting about 90 microseconds after peak A. When the touchscreen was touched, the dip C appeared in signal B as desired for touchscreen operation.

A small parasitic signal D is observed at about 80 microseconds, i.e., 10 microseconds before the desired signal starts. Elimination of this signal was observed by damping both the top and bottom surface of the glass substrate near edge with the two grating transducers.

Another small parasitic E is observed about 20 microseconds after the desired signal. This parasitic is also often observed in touchscreens with wedge transducers. For both wedge and grating transducer cases, this parasitic signal can be eliminated with appropriate acoustic dampers appropriately placed on the top surface of the glass (to eliminate reflections of Rayleigh waves off the glass edges).

EXAMPLE 3

Figure 8:
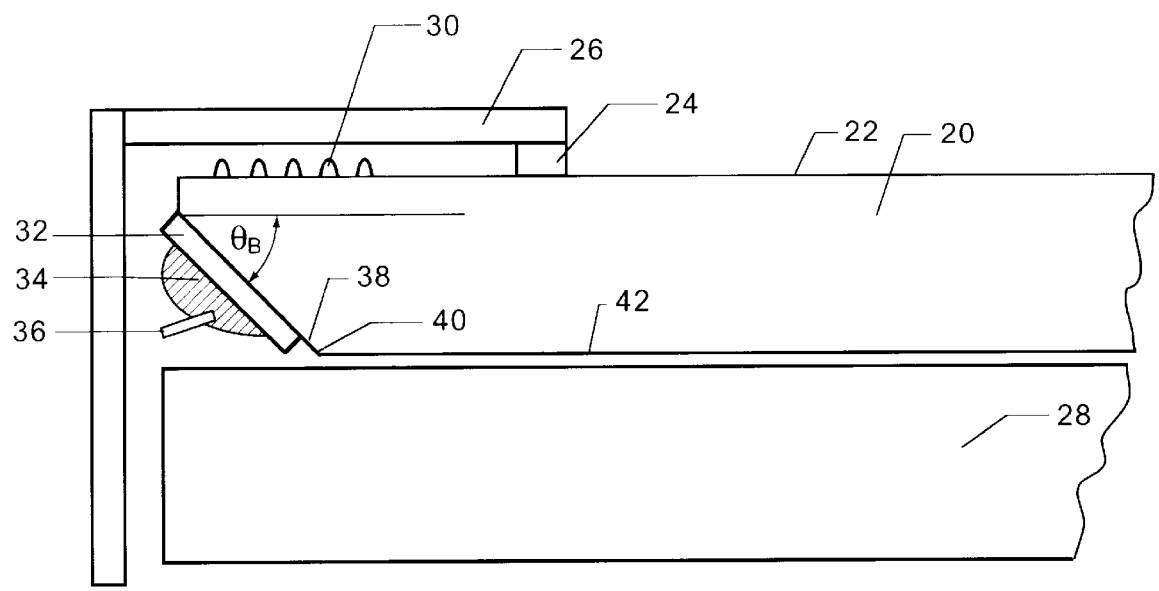
FIG. 8 shows a grating transducer device according to the present invention with direct path, rear bevel mount compression-mode piezoelectric transducer, and obtuse incident angle, with a front bezel and surface seal, in front of a flat panel display.

FIG. 8 shows a grating transducer adapted and applied to an acoustic touchscreen, providing a good fit for an acoustic touchscreen into an LCD touchmonitor. In FIG. 8, a bezel 26, including a seal 24, provides a barrier between the environment and the sensitive workings of the touchscreen. The front surface 22 of the substrate 20 abuts the seal 24. The seal 24 is provided to allow sufficient acoustic wave energy to permit touchscreen operation, while protecting grating 30 and piezoelectric transducer 32, as well as flat panel display 28 from contamination. The piezoelectric element 32 is bonded to a rear bevel 38 of the substrate 20, and electrically connected with solder 34 and a wire 36. The bevel is inclined at an angle $\theta_B$ with respect to a grating 30 disposed along an axis of propagation of the bulk wave emitted by the piezoelectric transducer 32 during excitation, or the axis of maximum sensitivity of the transducer to bulk acoustic waves in the substrate 20. The grating 30 couples a bulk wave propagating along an axis an angle inclined to the grating 30 with a surface bound or plate wave having significant energy at the surface 22.

From the perspective of LCD touchmonitor design, the grating transducer is seen to provide several benefits that are not obvious from the perspective of touchscreen design alone. The grating has a low profile, typically much lower in height than an optional seal, and easily fits under the bezel. The piezoelectric element, including solder connections and associated wire routing, may fit into the volume of removed substrate material associated with the beveled surface of the substrate. Grating transducers thus enable elegant mechanical design solutions for LCD touchmonitors.

EXAMPLE 4

Grating transducers, similar to those described in Example 2, were fabricated on a substrate of 3 mm thick soda-lime glass.

These grating transducers had a tilted-piezoelectric element ($\theta_B$=45°) with grating elements as shown in FIG. 6. The grating was constructed by depositing glass frit ink with the same screen printing process and oven cure above 400° C. used to fabricate reflective arrays. The high temperature cure sinters the glass frit and bonds it to the glass substrate. The cured glass frit is a rigid ceramic material with a density of about 5.6 grams per cubic centimeter. Grating heights up to 40 microns were obtained using multiple passes of the screen printing process.

A grating spacing of 0.89 mm was designed based on the principles given in Masao Takeuchi and Hiroshi Shimizu, "Theoretical analysis of grating couplers for surface acoustic waves" Journal of the Acoustic Society of Japan, 36(11) :543–557 (Jun. 24, 1980). This calculation assumed a Rayleigh wave velocity of 3103 meter/second, bulk pressure wave velocity of 5940 meter/second, bulk wave angle of 45°, and an operating frequency of 5.53 MHz.

Alternately, suitable reflective elements may also be formed by an ablation process, such as a sand blasting.

The piezoelectric element was constructed of a ceramic piezoelectric material from Fuji Ceramics, as known in the art, and used in wedge transducers for a number touchscreen products available from of Elo TouchSystems, Fremont Calif., and TPS, Tokyo, Japan. This material is in the family of PZT related piezoelectric ceramics. The piezoelectric elements have a fundamental resonance nominally at 5.53 MHz, although the design frequency is a matter of choice. The piezoelectric elements are 3 mm wide.

The piezoelectric element was bonded to a beveled surface at an angle of 45° with respect to the horizontal substrate surfaces. The conductive electrode on the side of the piezo bonded to the glass extended around the piezoelectric element, so that both piezo electrodes could be soldered to wires on the same exposed surface.

A HP 8012B Pulse Generator was used to generate a 5-microsecond gate that was repeated every 5 milliseconds. This gate was used to trigger a HP 8111A Function Generator, which in turn generated tone bursts of 5-microsecond duration. The HP 8111A was programmed to generate sine-wave tone bursts at a frequency of 5.53 MHz with nominal amplitude of 10 Volts. These tone bursts were viewed on a Yokogawa DL12000 4-channel digital oscilloscope using a 1MΩ input channel. These tone bursts were used to excite the grating transducer under test.

A wedge transducer was placed on the glass substrate at a distance of 25 cm from the grating transducer and connected to a second a 1MΩ input channel of the Yokogawa DL12000 4-channel digital oscilloscope. The timing and the amplitudes of the transmit burst to the grating transducer and the received signal from the wedge transducer were viewed simultaneously on the digital oscilloscope.

A signal from the grating transducer was observed at the wedge transducer, demonstrating successful emission of a wave having appreciable surface energy from the grating transducer.

Placing a finger or other Rayleigh-wave absorber between the grating transducer and wedge transducer eliminated the received signal. This demonstrates that the received signal is due to Rayleigh wave propagation between the grating transducer and the wedge transducer, as wave modes with substantial subsurface power would have been expected to demonstrate a lesser degree of attenuation, and in this substrate and at this emission frequency, the only reasonably likely wave mode observed is a quasi-Rayleigh wave. Furthermore, the time delay between the tone burst and the received signal corresponds correctly to the known Rayleigh wave velocity on the glass substrate.

EXAMPLE 5

Examples 1, 2 and 4 employ grating transducers with an emission (or reception) angle of 0°. That is, the direction of the Rayleigh wave is the same as the projection of the axis of propagation of the bulk wave on the horizontal plane. The grating transducer design is not so limited. The grating transducer concept can be generalized to the case in which the propagation direction of the Rayleigh wave has a non-zero emission angle, $\theta_E$, with respect to the horizontal component of the bulk wave direction. Non-zero emission angles have the following two potential advantages.

Figure 9:
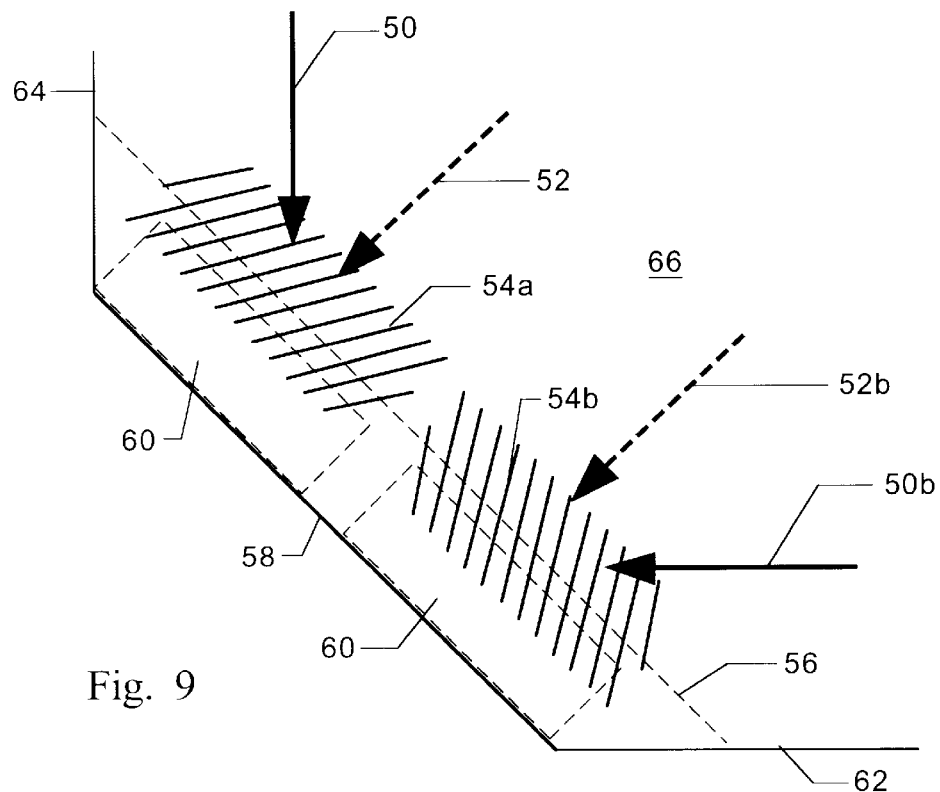
FIG. 9 shows a grating transducer system in which the projection of the axis of propagation of the bulk wave in the plane of the substrate differs from the axis of propagation of the converted wave.

Non-zero emission angles add mechanical design flexibility. See FIG. 9, showing a plan view of a pair of receiving grating transducers at one corner 58 of a touchscreen 66. Each grating transducer includes a piezoelectric element 60a, 60b mounted on a rear bevel surface 56, with a set of grating elements aligned through the substrate 66 along a piezoelectric transducer-bulk wave coupling axis 52a, 52b. The gratings 54a, 54b are inclined with respect to the axis of bulk wave propagation 52a, 52b, so that the bulk wave is converted to a wave mode which is bound to a single surface or a plate wave traveling along an axis 50a, 50b different from the axis of bulk wave propagation, traveling parallel to the substrate 66 edges 64, 62 respectively.

Such a design is advantageous if, for example, there is a mechanical interference between the nominal corner of the glass substrate and another component of a touchmonitor such as a mounting post.

A second benefit of a non-zero emission angle is an angular separation of the desired Rayleigh-wave emission angle and the zero emission angle typical of parasitic bulk waves generated by the piezoelectric element. Equivalently, as indicated in FIG. 9, there is an angular separation of the direction of sensitivity of a receiving grating transducer and its direction of sensitivity to incoming parasitic bulk waves. It is noted that the bulk wave coupled with the piezoelectric transducer may have an arbitrary angle with respect to the Rayleigh wave, for example 90°, providing possibilities for substantial spatial separation of the desired Rayleigh wave and parasitic waves traveling parallel to the horizontal projection of the propagation axis of the bulk wave.

Therefore, a system was constructed having a tilted-piezoelectric element ($\theta_B=45°$) and non-zero emission angle ($\theta_E=30°$) grating transducer. Fabrication methods were the same as for the zero-emission-angle embodiment of Example 4. The only difference was that the grating spacing and orientation were modified to meet the horizontal components of the Bragg scattering condition to couple the Rayleigh-wave wave-vector to the horizontal component of the bulk pressure wave.

These 30°-emission-angle-grating transducers were tested using the same experimental methods discussed in the zero-emission-angle embodiment of Example 4. Quantitative time delay data and sensitivity to surface absorbers confirmed that it was a Rayleigh wave signal. Operation of a non-zero emission angle grating transducer has thus been clearly demonstrated.

The angular directivity of the nominally 30°-emission-angle grating transducer ($\theta_B=45°$) was measured by placing a receiving wedge transducer at different locations on a circular arc at a radius of 250 mm from the grating transducer. The relative measured signal amplitude (relative to the maximum amplitude observed) transmitted through the pair of transducers as a function of emission angle is shown in the table below.

| Emission angle | Relative Measured signal amplitude [dB] |
| --- | --- |
| 26° | −14 |
| 27° | −13 |
| 28° | −11 |
| 29° | −4 |
| 30° | −1 |
| 31° | 0 |
| 32° | 0 |
| 33° | −1 |
| 34° | −4 |
| 35° | −10 |
| 36° | −14 |

The grating transducer was observed to have a directed transmitted beam at a non-zero emission angle. The observed peak in the emission angle of 31.5° is close to the nominal design value of 30°. Thus, it is seen that a grating transducer can support non-zero emission angles, providing important new options for the design of acoustic touchscreens.

EXAMPLE 6

Figure 10:
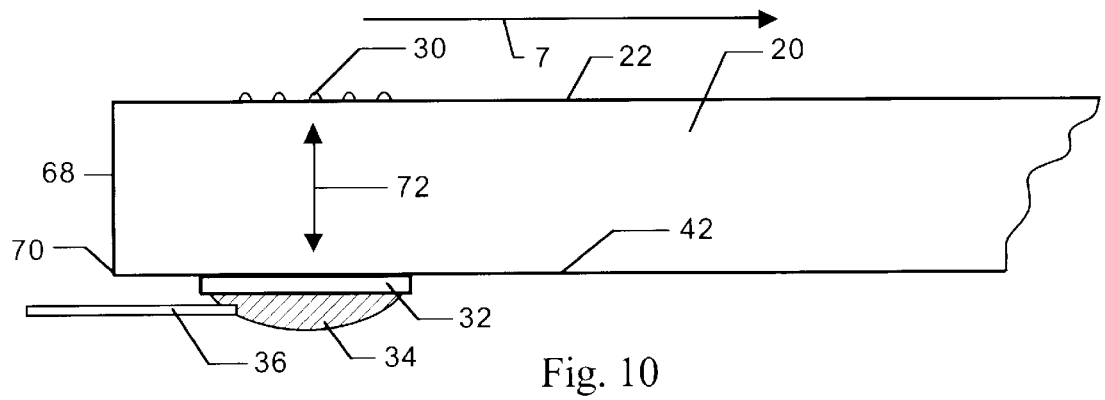
FIG. 10 shows a grating transducer device according to the present invention with direct path, rear mount compression-mode piezoelectric transducer, having a thickness resonance in the substrate between the piezoelectric transducer and the scattering elements.

As indicated in FIG. 10, the special case of a horizontally mounted piezoelectric element 32 is an option, that is, $\theta_B=0$. Note that this grating transducer design avoids the need for a machined bevel surface at the edge 68 of the substrate. This absent manufacturing process has potential to reduce manufacturing cost. As shown in FIG. 10, the bulk wave 72 partially reflects off the front surface 22 proximate to the gratings 30, producing a converted wave mode 79 which is a Rayleigh wave. A portion of the wave energy is converted to a wave traveling parallel to the surface 22. Typically, the rear surface 42 of the substrate 20 has low acoustic energy coupled to a received wave, and is therefore insensitive to touch, permitting mounting on the rear surface.

Touchscreens incorporating $\theta_B=0°$ grating transducers were designed, assembled, and tested. Methods used were the same as in Example 2, except that the glass substrate was not provided with a bevel. Again, the resulting grating transducer touchscreen were produced that were fully functional and had production quality signals. Again, generation of parasitic waves did not prevent successful operation of grating transducer acoustic touchscreens and observed parasitic signals were minimal.

To make comparisons, wedge transducers were temporarily placed immediately in front of the grating transducers. For this $\theta_B=0°$ case, the grating transducers and the wedge transducers gave the same touchscreen signal amplitudes within experimental errors. While the grating transducer design and fabrication were not optimized for the $\theta_B=0°$ grating transducers, transducer efficiencies of commercial interest have been clearly demonstrated Note that roughly 10 dB (5 dB per transducer) signal increase is observed relative to the $\theta_B=45°$ grating transducer of Example 2. This experimental observation suggests that new physical effects may lead to enhanced efficiencies for $\theta_B=0°$ grating transducer designs.

EXAMPLE 7

Grating transducers, similar to those described in Example 6, were fabricated on a substrate of 3 mm thick soda-lime glass, having $\theta_B=0°$ grating transducers.

Measurements were made using the same fabrication techniques and test methods described in Example 4, except that the glass was not beveled and the piezoelectric element was mounted opposite the grating on the lower surface of the glass, as shown in FIG. 10. An increased efficiency was observed relative to the $\theta_B=45°$ grating transducers of Example 4. This confirms that the increased signal amplitude of the touchscreen of Example 6 relative to the touchscreen of Example 2 is indeed due to an enhancement of the grating transducer efficiency for $\theta_B=0°$.

In the $\theta_B=0°$ case, new mechanisms or physical effects come into play, not present in the $\theta_B\neq0°$ cases. The vertical bulk wave can undergo multiple reflections at the top and bottom substrate surfaces and still have the correct orientation and phase to couple to the piezoelectric element and to Rayleigh waves via the grating. These multiple reflections provide means to enhance grating transducer efficiency by providing the bulk wave more than one chance to couple via the gratings to the desired acoustic mode.

Another way to look at the $\theta_B=0°$ case is to consider thickness resonances of the substrate. Both the grating and the piezoelectric element couple to thickness oscillations of the substrate. A preferred means for obtaining this resonant condition is to place the piezoelectric transducer on a surface parallel with the grating transducer surface. While equivalent to the multiple reflection conceptual model discussed above, the thickness oscillation framework considers this effect in the frequency domain rather than the time domain. It is thus of interest to consider what happens when the operating frequency corresponds to a thickness resonance of the substrate.

By tuning the substrate thickness and/or operating frequency, the thickness resonance can be strengthened. This provides further means to enhance transducer efficiency. Thickness mode resonance or multiple reflections of vertical bulk waves may be used to increase the coupling via the grating between, e.g., vertical pressure waves and, e.g., Rayleigh waves. This in turn reduces the optimal grating height for maximum transducer efficiency, and hence simplifies the manufacturing process.

Figure 11:
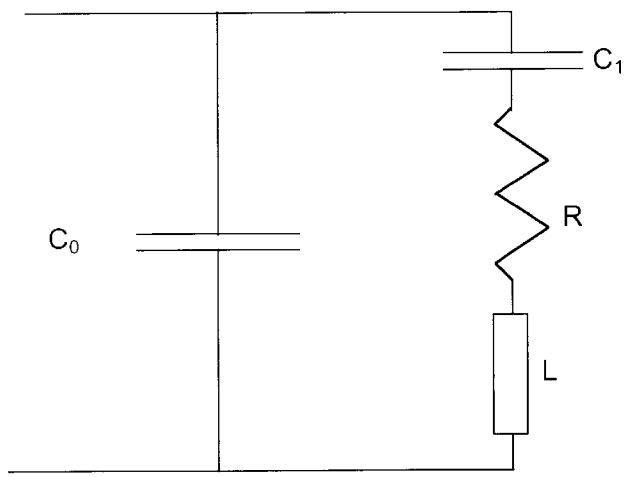
FIG. 11 shows a schematic equivalent circuit of the piezoelectric transducer-substrate system.

The thickness mode resonance also provides design freedom to tune the equivalent circuit resistance of the bonded piezoelectric element and hence control electronic impedance characteristic of the acoustic touchscreen. FIG. 11 shows an equivalent circuit for a grating transducer. Such oscillations or multiple reflections alter the mechanical or acoustic impedance of the, e.g., glass surface to which the piezoelectric element is bonded. At a thickness resonance, the acoustic impedance of the glass is reduced and the mechanical Q of the piezo bonded to the glass is increased. This has the consequence that the equivalent circuit resistance ("R" in the circuit diagram of FIG. 11) of the transducer is reduced.

If the piezo is properly tuned to the operating frequency, i.e. $1/\{2 \pi\sqrt{(LC_1)}\}$ equals the operating frequency, then the impedances of the resonating inductance and capacitance cancel and the equivalent circuit is simply capacitance $C_0$ in parallel with resistance R. The power delivered to the piezo is given by $V^2/R$ where V is the root mean square of the applied driving voltage.

The transducer excitation burst circuitry of known commercial touchscreen controllers often more closely approximate a voltage source than a current source. This is particularly true if the transmit burst amplitude is limited by maximum-voltage safety criteria (e.g., of Underwriter Laboratories). Assuming a fixed voltage for an excitation signal, a smaller equivalent-circuit transducer resistance means increased electrical power delivered to the transducer. Hence with some controller designs, the thickness resonance may significantly increase the electrical power available to convert to acoustic waves.

EXAMPLE 8

Grating transducers were fabricated and successfully tested on aluminum substrates. Aluminum may be used as a substrate for opaque touch panels. This illustrates that the principles of grating transducer operation are not limited to a particular choice of substrate materials.

A grating was formed by machining grooves in the surface of the aluminum substrate. The grates were designed to be grooves 51 microns deep, 254 microns wide, and with a 533 micron center-to-center spacing. The grating had 10 grates.

As in Example 6, employing a glass substrate, the piezoelectric element is mounted horizontally and the emission angle is zero. In this case, the thickness of the aluminum substrate in the region of the grating was designed to correspond to a thickness resonance. The thickness of the substrate was 2.29 mm in the region of the grating.

Grating transducer operation was observed using tests similar to those described in Example 4. A 3 to 4 microsecond tone burst with an amplitude of 14 Volts peak-to-peak was used as a transmit pulse to excite a wedge transducer. The Rayleigh wave from the wedge transducer was directed at the grating. A 2 mm wide piezo was mounted on the bottom of the substrate under the beginning of the grating. A received signal was observed with a peak amplitude of 1.4 Volts peak-to-peak, i.e., −20 dB with respect to the excitation signal. The signal amplitude for a pair of wedge transducers gave a similar measured signal.

Note successful construction of a grating transducer using grooves rather than deposited material on the substrate. This further demonstrates a variety of manufacturing processes for grating fabrication.

EXAMPLE 9

Prototype horizontal-piezo ($\theta_B=0°$) and non-zero emission angle ($\theta_E=45°$) grating transducers were fabricated with three different grating materials, including two materials which are not characterized as glasses. Rayleigh wave emissions were observed in all three cases; cured glass frit (about $10\mu$ height); Lithopone™ loaded epoxy (about $25\mu$ height); and tungsten loaded epoxy (about $25\mu$ height). The epoxy thus provides a polymer matrix for an inorganic filler composition. The mass deposited for the glass frit and Lithopone™ loaded epoxy gratings were approximately the same and the corresponding received signals were the same within experimental uncertainties. The tungsten loaded epoxy gratings had two to three times the mass and had a corresponding increase in received signal amplitude.

The use of polymer grating materials provides increased design and process flexibility.

EXAMPLE 10

In Examples 2, 4, 5, 6 and 7, the bulk wave coupled to the piezoelectric element is a pressure wave. For example, elements 4a, 4b, 10a, and 10b shown in FIGS. 5 and 6 are optionally shear mode piezoelectric elements. However, as is demonstrated in the present embodiment, a bulk shear wave can be generated using the more conventional and lower cost pressure mode piezoelectric element.

Figure 12:
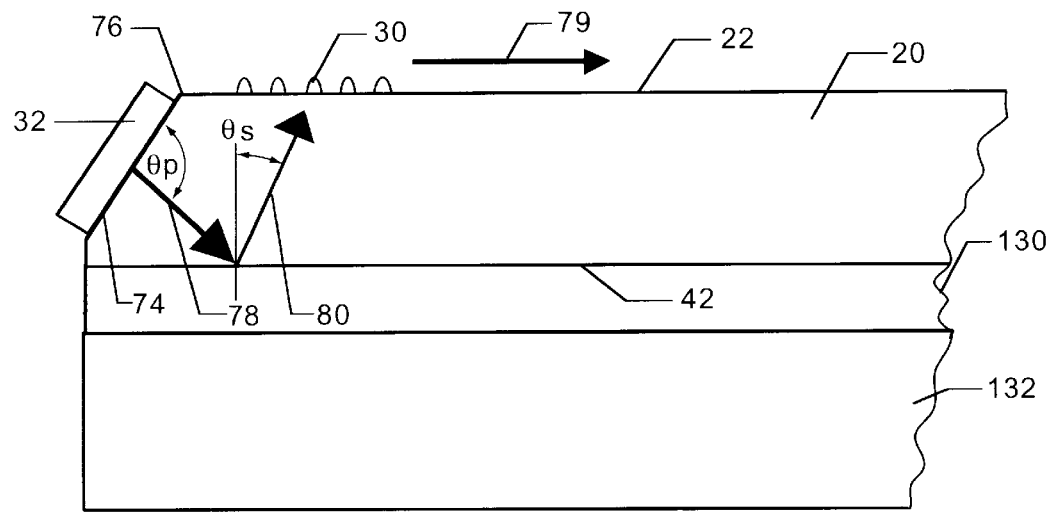
FIG. 12 shows a grating transducer device according to the present invention with a reflected path, front bevel mounted piezoelectric transducer producing a shear-mode bulk wave, and obtuse incident angle.

This embodiment is implemented by using a compression-mode piezoelectric element 32, mounted unconventionally, as shown in FIG. 12, so that the bulk wave 78 is converted to a shear wave 80, with particle motion in the plane of the paper, before it reaches the grating 30. In FIG. 12, the substrate 20 is soda-lime glass with a bulk pressure wave velocity of 6000 meters per second and a bulk shear wave velocity of 3433 meters per second. The 5.5 MHz compression-mode piezoelectric element 32 is tilted with respect to the horizontal by an angle $\theta_p=62.6°$. The emitted bulk pressure wave 78 propagates in a downward direction at an angle of $\theta_p$ with respect to the vertical direction. This leads to an upward reflected shear wave 80 propagating at an angle $\theta_s=30.5°$ with respect to the vertical direction. The value of $\theta_s$ is determined by Snell's Law:

$$\sin(\theta_s)/V_s = \sin(\theta_p)/V_p.$$

The value of $\theta_p$ in this example is chosen to satisfy an acoustic analog of Brewster's angle of optics. As can be calculated using known acoustic principles, e.g., see, equation 9.45 ($\Gamma_{II}= \ldots$), B. A. Auld, Acoustic Fields and Waves in Solids, ($2^{nd}$ ed.) Vol. II, Krieger Publishing Co., Malabar, Fla., 1990, ISBN 089874783-X, the incident pressure wave is 100% reflected as a shear wave. Such a mode converting reflection enables efficient bulk shear wave generation with a common pressure mode piezoelectric element.

The ability to illuminate the grating 30 with a shear wave 80 even with a pressure mode piezoelectric element 32, provides an interesting option to alter or optimize the "F" factor for, e.g., Rayleigh wave generation (see Takeuchi et al. 1980).

This case, shown in FIG. 12 provides particular benefit when the substrate shown is an upper laminate 20 of a safety glass lamination 20, 130, 132, i.e., soda lime glass 20, 132 sandwiching polyvinyl butyrate polymer 130, or other laminate. In this case, the shear wave reflects off the rear surface 42 of the upper glass sheet 20, and due to large the difference in acoustic impedance between glass 20 and polyvinyl butyrate 130, most of the wave 80 will still be reflected upward toward the grating 30 and converted to, e.g., a Rayleigh wave 79. On the other hand, parasitic plate wave modes will be rapidly attenuated by the polymer layer 130. The bevel 74 on the upper side of the top laminate 20 of the safety glass lamination is easily accessible for, e.g., a robotic piezoelectric element process, and also eliminates mechanical interference between the piezoelectric element 32 and any excess polymer 130 extending beyond the glass sheet forming the substrate 20.

For this specific example, with $\theta_s=30.5°$, the shear wave has a fraction $\sin^2(\theta_s)$ or about 26% of its power in the form of shear motion in the vertical direction, and a fraction $\cos^2(\theta_s)$ or about 74% of its energy in the form of horizontally polarized shear motion. As illustrated in a later example, this large horizontal shear component makes possible embodiments in which the emitted wave from the grating is a horizontally polarized shear wave, such as a Love wave or a HOHPS wave.

EXAMPLE 11

Figure 13A:
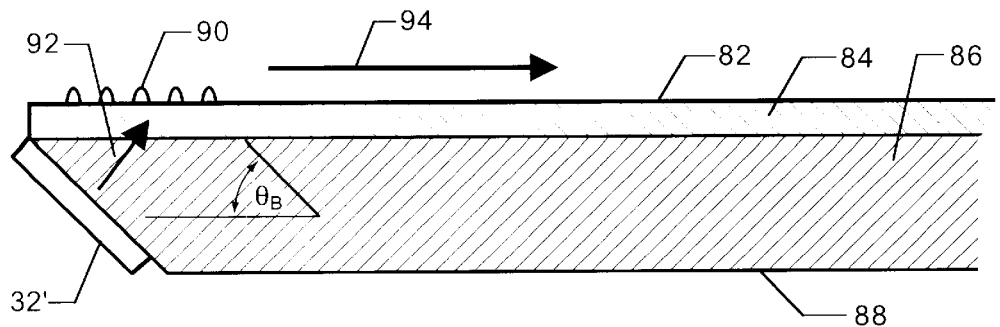
FIG. 13A shows a grating transducer device according to the present invention in a Love wave supporting substrate with a direct path, rear bevel mount shear-mode mounted piezoelectric transducer, and obtuse incident angle.
Figure 13B:
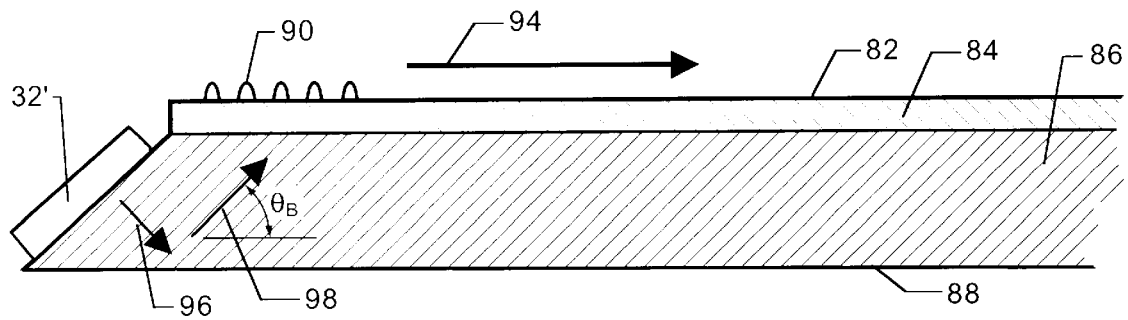
FIG. 13B shows a grating transducer device according to the present invention in a Love wave supporting substrate with a reflected path, front bevel mount shear-mode mounted piezoelectric transducer, and obtuse incident angle.

Grating transducers can be designed in which the transmitted (or received) acoustic mode is not a Rayleigh wave. FIGS. 13A and 13B consider grating transducers using a horizontal shear mode piezoelectric element 32' which excites a horizontally polarized shear wave, namely a Love wave 94.

The layered substrate 84, 86, is, e.g., a 0.5 mm thick layer of slow bulk shear velocity glass, such as Schott B270™ glass, a barium containing glass, bonded to 3 mm layer soda-lime glass. Such a substrate 84, 86 can propagate a Love wave 94, which provides a higher power density of horizontal shear motion at the surface 82 than that provided by a lowest order horizontally polarized shear (ZOHPS) wave in a 1 mm thick glass substrate. The shear motion of the piezoelectric element 32', the shear motion of the bulk shear wave 92, the axes of the grates 90, and the shear motion of the Love wave 94, are all perpendicular to the plane of the paper in FIG. 13A.

FIG. 13B, on the other hand, employs a similar geometry to that shown in FIG. 12. However, in this case, the horizontally polarized bulk shear wave 96 from the horizontal shear mode piezoelectric element 32', simply reflects off the back surface 88 of the substrate 86, with no mode conversion, and hence the angle of incidence equals the angle of reflectance. Such grating transducers can be designed with the variations of piezo orientation and emission angle discussed above. However, for large emission angles, e.g., 90° as a worst case example, efficiency is lost as the horizontal shear motion of the bulk wave is no longer parallel to the horizontal motion of the emitted wave.

The spacing and orientation of the grating are determined by the Bragg scattering condition between the wave vector of the emitted Love wave and the horizontal component of the wave vector of the bulk wave.

EXAMPLE 12

Figure 14A:
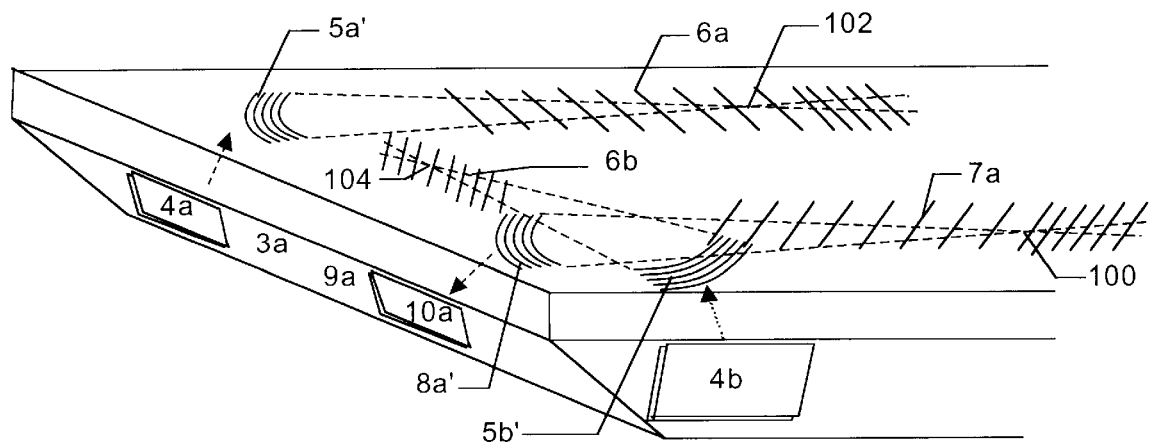
FIG. 14A shows a grating transducer touchscreen system according to the present invention having gratings which emit a converging acoustic wave.

Focusing grating transducers can be constructed by providing curvature to the grates 5a', 5b', 8a', as shown in FIG. 14A. Note that there is no need for a curved piezoelectric element. With no added manufacturing cost to the piezoelectric element, grating transducers provide freedom to adjust the focusing characteristics of emitted acoustic beams. This is not the case for wedge transducers and edge transducers.

Figure 14B:
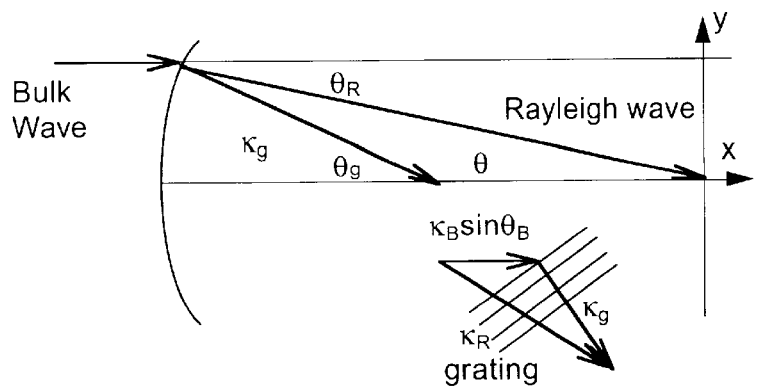
FIG. 14B shows a schematic Figure of the mode conversion and focusing effects of a curved grating element.

For a grating transducer with a horizontally oriented piezoelectric element, the radius of curvature of the gratings 5a', 5b', 8a' is set equal to the desired focal length 100, 102, 104. The effective focal length is preferably about one-half to three quarters the length of the reflective array 6a, 6b, 7a, although the focal length may also be at or longer than the length of the reflective arrays. These grating elements may also be parabolic or other desired configuration to direct the acoustic wave energy along a desired path. Typically, the desired focal length of the grating is large compared to the dimensions of the grating, and parabolic curvature and circular curvature are practical equivalents. For a grating transducer with a tilted piezoelectric element, there is equal freedom to adjust the focal length, although the governing mathematical equations are more complex. The principles of Bragg scattering are still applicable. The desired Bragg scattering angle becomes a function of position within the grating transducer. The curvature of the grates of the focusing grating transducers may be designed with the aid of FIG. 14B and the following equations.

$dy/dx = \tan(\pi/2 - \theta_g)$ $\kappa_g^2 = [\kappa_B \sin \theta_B]^2 + \kappa_R^2 - 2 \cdot \kappa_B \sin \theta_B \kappa_R \cos \theta$ $\sin(\theta_g - \theta) = [\kappa_B \sin \theta_B \sin \theta]/\kappa_g$ A slight focusing of transducer beams can be used to partially offset signal loss from diffractive beam spreading. For example, the focusing grating transducer focal length may be set to have the length, or half the length, of the reflective array. As shown on FIG. 14A, which does not show reflective arrays, but may encompass both the Adler-type touchscreen or the Johnson-Freyberger type touchscreen of U.S. Pat. No. 3,673,327, the gratings may have a focal point, which is preferably about half to three quarters the distance across the substrate.

EXAMPLE 13

Figure 15A:
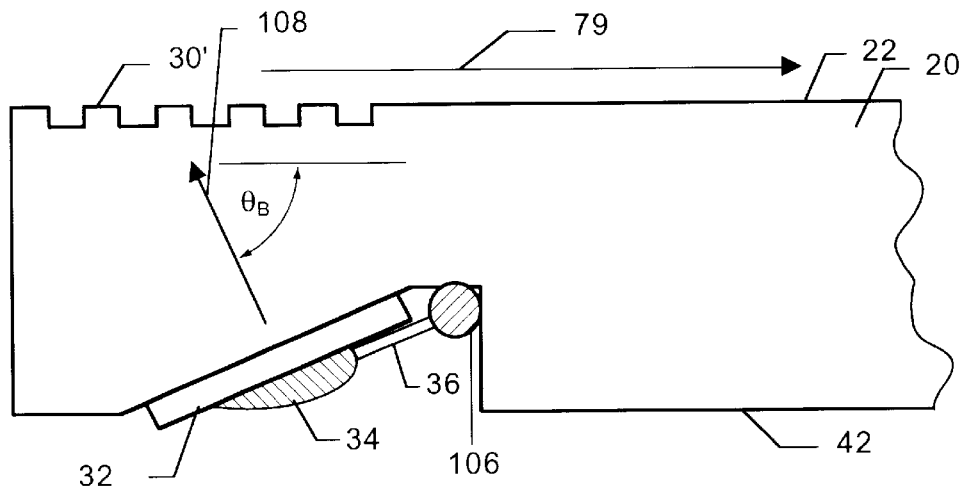
FIG. 15A shows a grating transducer device according to the present invention with a direct path, rear internal bevel mounted piezoelectric transducer, and acute incident angle, in a polymer substrate.

FIG. 15A considers the design a grating transducer in which the F-factor may be one and hence for which the transducer efficiency is further enhanced; see Takeuchi et al. (1980). This is possible with a bulk shear wave incident on the grating with a sufficiently negative value for $\theta_B$ satisfying the following equation.

$|\sin(\theta_B)| > V_s/V_p = (0.5 - \sigma)/(1 - \sigma)^{1/2}$ where $V_s$ is the bulk shear velocity, $V_p$ is the bulk pressure wave velocity, and $\sigma$ is the Poisson's ratio. When this condition is met, and the grating spacing is designed to couple bulk shear waves and Rayleigh waves, there is no coupling of Rayleigh waves to bulk pressure waves via Bragg scattering. For aluminum with a Poisson's ratio $\sigma=0.355$, the above condition is numerically evaluated as $\theta_B > 28.3°$. Hence a grating transducer with F=1 can be constructed with a horizontal-shear piezoelectric element mounted on a substrate surface tilted in the direction indicated by FIG. 15A by, e.g., 30°.

Thus, as shown in FIG. 15A, the piezoelectric transducer 32 is set to produce a bulk wave 108 having a projection of an axis of propagation in the plane of the grating 30' opposite from the axis of propagation of the converted wave mode 79. The piezoelectric element 32 is shielded within an internal bevel, allowing the solder 34 bump, bond wire 36 and signal cable 106 to be protected.

In some cases, it may be advantageous for the piezo, solder connections, and wire routing to protected by being placed within a concave indent into the substrate as shown in FIG. 15A. In some cases, these mechanical design advantages will justify the geometry of FIG. 15A even if F<1 because, e.g., a lower cost pressure-mode piezoelectric element is used.

Particularly for polymer substrates formed by a molding process, the substrate geometry of FIG. 15A can provide with little added manufacturing cost the benefits of F=1 and mechanical protection of the piezoelectric element. For example, for Styron® 666 (polystyrene from Dow Chemical), Poisson's ratio σ=0.35 and again a shear-mode piezo negatively tilted by about 30° or more provides F=1.

The polymer substrate embodiment of Rayleigh or Love-wave grating transducers of the geometry of FIG. 15A are of particular interest because, as noted above, wedge transducers are difficult or impossible to design for polymer substrates. Note that for molded polymer substrates, the grating (and the reflective arrays) can be designed into the mold. In such a process, it is not difficult to support gratings with a variable height or depth.

Figure 15B:
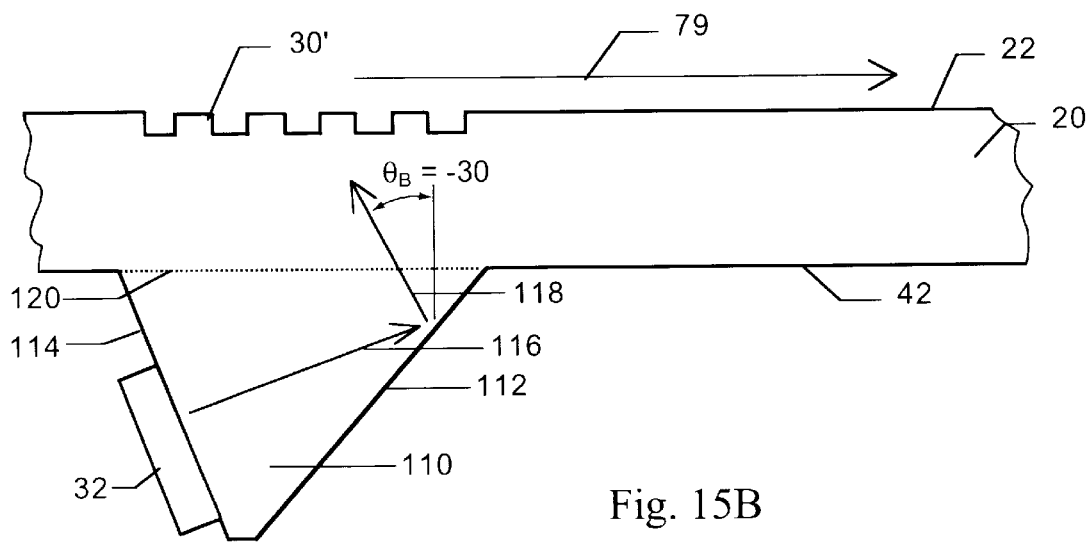
FIG. 15B shows a grating transducer device according to the present invention with an edge mounted shear-mode piezoelectric transducer, reflected path off a rear internal bevel, and acute incident angle.

An alternate embodiment, as shown in FIG. 15B, combines the principles of FIG. 15A and FIG. 12. For example, for a polystyrene substrate 20, the piezoelectric element 32 may be mounted at a 60° angle with respect to the horizontal. The piezoelectric element 32 couples to a bulk pressure wave 116 propagating at 60° with respect to the vertical, directed toward the grating 30'. At the reflective surface 112, this bulk pressure wave is reflected by 90° and mode-converted into a bulk shear wave 118 with $\theta_B$=−30°. The reflective surface 112 makes an angle of 55.6° with respect to the vertical. The acoustic principles given in B. A. Auld's textbook referred to in Example 10 result in a 77% mode-conversion efficiency at the reflective surface.

FIG. 15B also demonstrates the possibility of mounting the piezoelectric transducer 32 on a wedge structure 110, which may be bonded with adhesive or other means at an interface 120 to the substrate 20. The interface 120 does not attenuate the bulk wave mode 118 to any great extent. Thus, the substrate 20 need not have preformed surface structures on both sides 22, 42.

FIG. 15B illustrates an example in which the bulk wave is reflected, and perhaps mode converted by one reflective surface. It is also possible to include two or more bulk-wave reflections in grating transducer designs. This adds further options to grating transducer designs for acoustic touchscreens.

Absorbers placed in the vicinity of the grating transducer structure can be used to suppress the effects of parasitic waves. The ability to mold reference surfaces and/or to apply acoustic impedance matching absorbers provide a great deal of flexibility in addressing parasitic waves.

EXAMPLE 14

For $\theta_B \neq 0°$, grating transducers are unidirectional, that is they preferentially emit a beam in the forward direction and not the backward direction.

For $\theta_B=0°$, symmetrically designed grating transducers are bi-directional, that is the emitting (or receiving) equally in the forward and backward directions. In some cases, it may be advantageous if the touchscreen grating transducer is designed to couple to two useful wave modes propagating antiparallel to each other.

Figure 16:
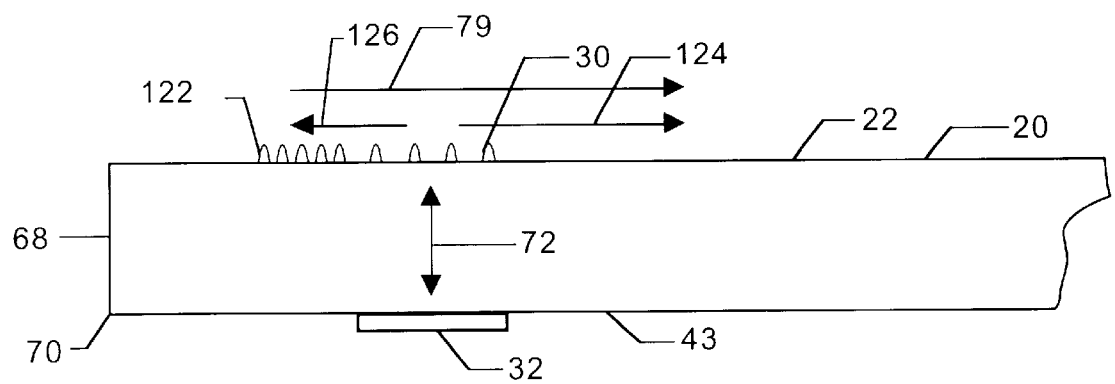
FIG. 16 shows a grating transducer according to the present invention with a resonant mounted piezoelectric transducer, having an asymmetric grating structure providing unidirectional acoustic wave emissions.
Figure 17:
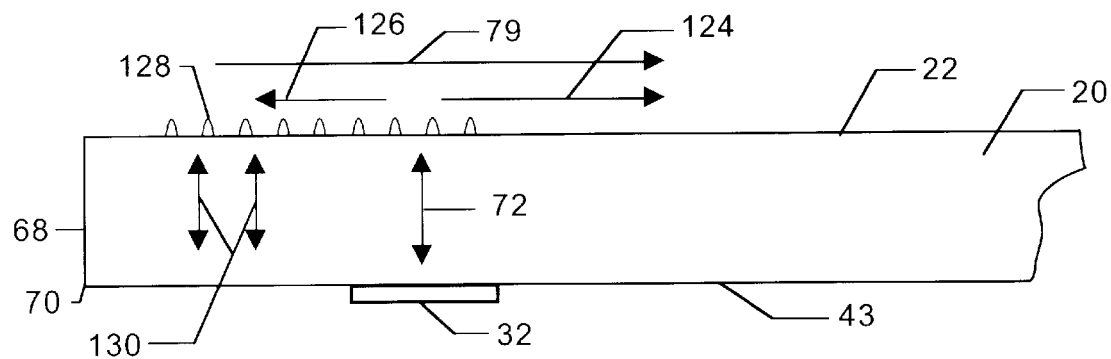
FIG. 17 shows a grating transducer according to the present invention with a resonant mounted piezoelectric transducer, having an asymmetrically placed transducer with respect to the grating structure, providing selectively directional acoustic wave emissions.

It is possible to design a unidirectional $\theta_B=0°$ grating transducers. One approach is to place an acoustic reflector behind the grating transducer. For example, a half-wave length grating (n+½)λ 122 may be placed behind the grating 30 intended to convert wave modes, as shown in FIG. 16. In the embodiment shown in FIG. 17, the reflector 128 is simply an extension of the wavelength-spaced (nλ) grating in the backward direction. A wavelength spaced grating 128 couples the backward acoustic wave 126 to vertical bulk waves 130 which reflect off the back surface 43 of the substrate and then couple to the desired forward acoustic waves 124 at the extension of the grating 128. The forward wave 124 and rear wave 126 are summed as an effective wave 79, emitted from the transducer system.

Figure 18A:
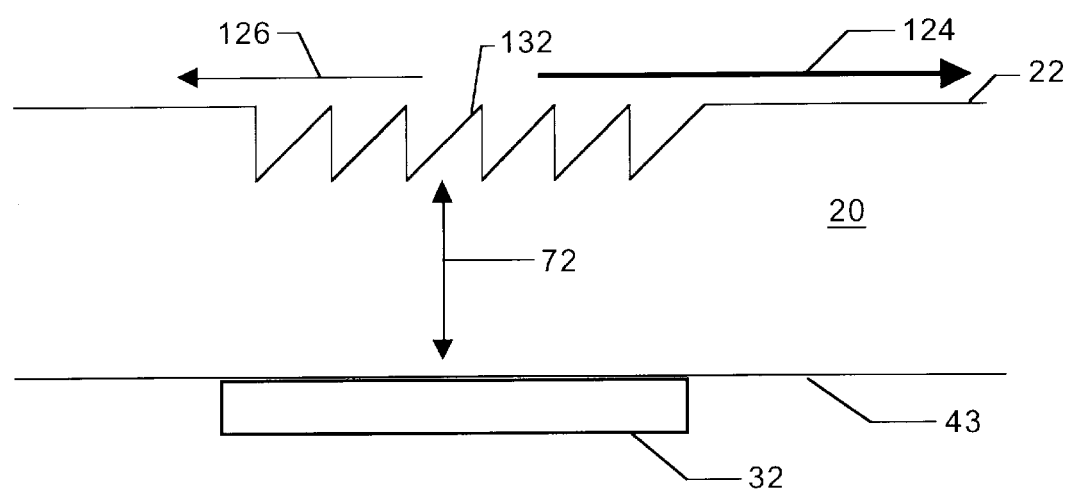
FIGS. 18A and 18B show two grating transducer embodiments according to the present invention with a resonant mounted piezoelectric transducer, having a grating structure with asymmetric elements, and an offset layered grating structure, respectively, providing selectively directional acoustic wave emissions.

Alternately, for Rayleigh-wave generation and reception, an asymmetric grating shape 132 may be employed, as shown in FIG. 18A. Experimental evidence that such a grating can be unidirectional is provided in a May 1, 1969 article of Electronics Letter (Volume 5 Number 9), incorporated herein by reference. Theoretically, the interaction of the vertical bulk wave with the asymmetrical grating may lead to elliptical particle motion. Given that Rayleigh waves moving in opposite directions correspond to elliptical particle motion in opposite directions, the elliptically excited grating will preferentially couple to Rayleigh waves of one direction.

Prof. Takeuchi and Prof. Yamanouchi, "Unidirectional excitation of plate waves in a periodic structure," October 1991, incorporated herein by reference, demonstrates that a periodic array of excitation centers offset by a eighth wavelength (n+⅛)λ from a periodic array of scattering centers can lead to unidirectional emission of acoustic waves. Similar principles can be applied according to the present invention to a grating transducer of a touchscreen.

Figure 18B:
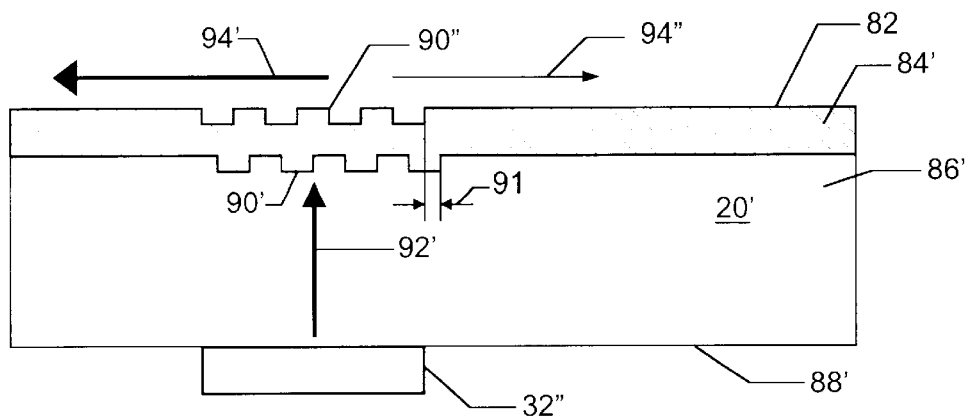

Surface-guided waves such as Rayleigh or Love waves do penetrate to some extent into the substrate; substantial energy density still exists, for example, one-half wavelength below the surface. According to one embodiment of the present invention, shown in FIG. 18B, elements of the diffractive acoustic wave mode coupler 90', 90" may also extend to a similar depth below the upper surface. The bulk wave 92' from the piezoelectric transducer 32", which in this case is a shear-mode piezoelectric element acoustically coupled to the bottom of the substrate 88', approaching the front surface 82 from the substrate 20', will reach the deeper-lying region 86' before it arrives at the shallow region 84'. The substrate 20' is formed as a laminate capable of supporting Love wave propagation. To allow for this time delay and corresponding phase shift, the elements of the diffractive acoustic wave mode coupler 90', 90" may have a relative offset 91 or be tilted, to achieve constructive interference for the desired direction of propagation of the Love wave 94' along the surface, with comparatively greater energy than a wave 94" propagating in an opposite direction. This type of coupler, therefore, may be made partly or fully unidirectional. In this case, the substrate may be, for example, aluminum coated with a dense layer a heavy metal-containing enamel. The buried diffractive acoustic wave mode coupler elements 90' may be formed as a stamped impression in the surface of the aluminum, which is filled with enamel 84' during coating, and the surface diffractive acoustic wave mode coupler elements 90" may be impressed into the enamel 84' before it is fully cured. The relative offset 91 is established by a mechanical fixture, not shown.

EXAMPLE 15

Acoustic sensors employing grating transducers need not be limited to arrangements limited to four transducers total. As is possible with acoustic touchscreens employing wedge transducers, designs with six, eight, or more transducers may be provided on a single touch sensor system or substrate according to the present invention. For example, in one embodiment of a rectangular touchscreen according to the present invention, two grating transducers are provided at each corner, with four sensor signals acquired for processing by the controller electronics to determine touch position: X right; X left; Y top; and Y bottom. This can be generalized further by, e.g., measuring the X coordinate by three of more array pairs. However, of particular interest are grating-transducer acoustic touchscreen embodiments that do not have wedge-transducer touchscreen analogues.

Note that grating transducers, like wedge transducers and unlike edge transducers, may be placed anywhere on the substrate surface, regardless of proximity to a free edge. However, unlike wedge transducers bonded onto the substrate surface, grating transducers need not present an acoustically completely opaque obstruction when placed in a useful acoustic path of another sensor subsystem. Grating transducers enable a greater design freedom to overlap sensor subsystems. In particular, grating transducers enable seamless tiling of sensor subsystems, as shown in FIGS. 19A and 19B.

Figure 19A:
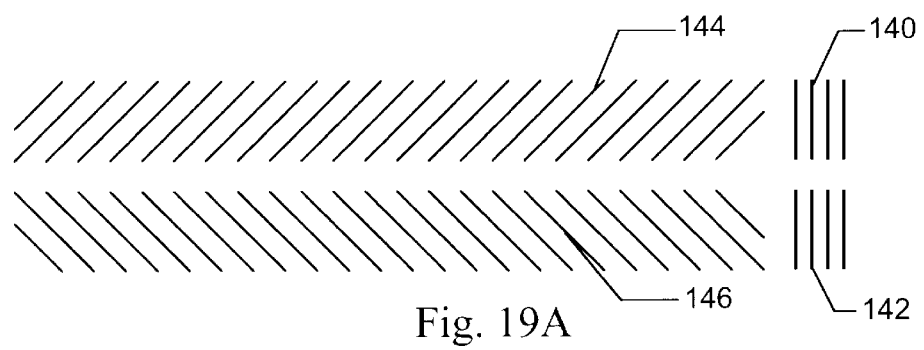
FIGS. 19A and 19B show a grating transducer according to the present invention with segmented reflective arrays, each reflective array segment being associated with a grating transducer structure.

FIG. 19A shows a pair of grates of a transmit 142 and receive 140 grating transducer as well as corresponding transmit 146 and receive 144 reflective arrays. Such grates and reflective arrays may be formed in many ways, for example, printing, etching, stamping of a metal substrate, or shaping of the mold for a polymer substrate. In a preferred embodiment, the gratings 140, 142 are part of unidirectional transducers, e.g., a wedge made of, e.g., the same material as the substrate material, is placed between the piezoelectric element and the back of the substrate, in an arrangement similar to that shown in FIG. 15B, so that $\theta_B<0°$.

Figure 19B:
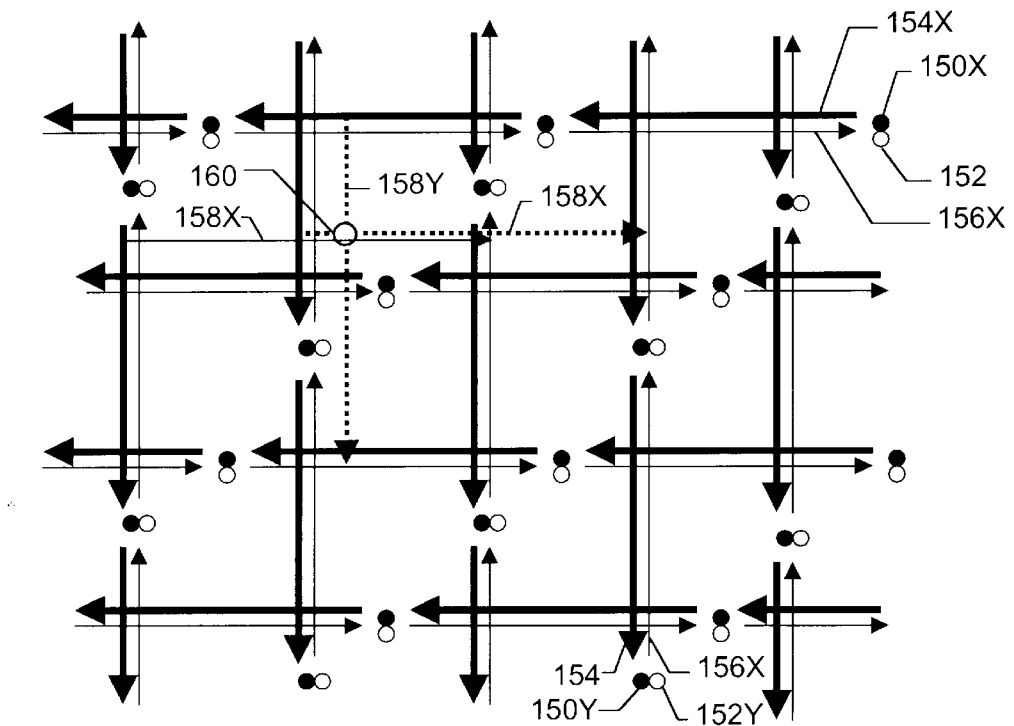

FIG. 19B shows one possible tiling arrangement of pairs of grates 150X, 152X, 150Y, 152Y, and reflective arrays 154X, 156X, 154Y, 156Y. The filled circles represent a transmit grating 150X, 150Y transducers as in FIG. 19A, the heavy arrows represents transmit reflective arrays 154X, 154Y, the light arrows represent receive reflective arrays 156X, 156Y, and the open circles represent receive grating transducers 152X, 152Y. Alternatively, the transmit and receive arrays are superposed and are associated with a single common transmit/receive grating transducer (not shown in the drawings). As indicated by dotted arrow in FIG. 19B, the X-transmit arrays 154X direct acoustic waves downward. Similarly, Y-transmit arrays 154Y direct acoustic waves towards the right. Note that each point on the surface is sensed by at least one X sensor subsystem and at least one Y sensor subsystem. For most of the touch surface, there are in fact two measurements of X and Y. Such a tiling can support a touch surface of arbitrary size. For touch 160, the Y coordinate is sensed by a wave 158Y. The X coordinate is sensed by waves 158X and 158X'.

In the embodiment of FIG. 19B, it may be desirable to use gratings (and reflective arrays) with reduced coupling strength. While this will reduce signal amplitudes and hence reduce the maximum size of individual sensor subsystems, it will beneficially reduce the shadowing of acoustic signals from components of other superposed sensor subsystems. Also, it may be useful to let desired acoustic paths deviate from orthogonal X and Y directions so that, e.g., the X reflective arrays product less of a localized shadow for the Y sensor subsystems. In a preferred embodiment, Rayleigh waves are used to sense touches. For example, the touch surface may be the aluminum or steel shell of a robotic device, which need not be planar. Such a touch sensitive robot surface may be used, e.g., for collision avoidance. Optionally, the metal touch surface may be provided with a plastic coversheet that is designed to make intimate acoustic contact only when a force presses the plastic against the touch surface.

In another preferred embodiment, Love-waves are used to sense touches. A Love-wave substrate may be provided, e.g., by aluminum coated with a dense enamel. In this case, the grating transducers and reflective arrays are provided as grooves or etchings in the aluminum surface, or as an applied material which protrudes into the enamel. Such an embodiment is of interest for, e.g., large whiteboard applications where reduced sensitivity to liquid contaminants, such as drying solvents from felt-pen ink, is desired.

EXAMPLE 16

Figure 20:
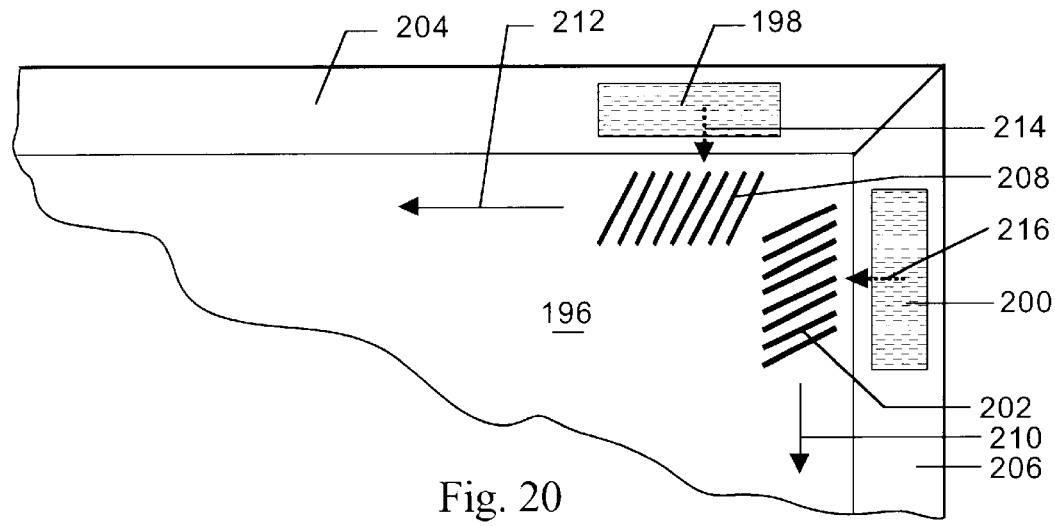
FIG. 20 shows a grating transducer according to the present invention on a substrate which supports Love wave propagation, wherein the converted Love wave travels at right angles to the axis of propagation of the bulk wave.

As discussed in Example 10, the pressure-wave mode piezoelectric element of FIG. 12 combined with a reflection off the back surface of the substrate can be used to couple to a bulk shear wave. The present embodiment shows that, unlike a bulk pressure wave, such a bulk shear wave may be used to couple to a Love wave. This embodiment includes a Love-wave substrate 196, e.g., as shown in FIG. 13B. FIG. 20, showing a receiver pair, illustrates a preferred embodiment in which Love waves 210, 212 are excited with emission angles of 90° in the plane of the gratings with respect to the axis of propagation of the bulk waves 214, 216, which in turn are reflected off the rear substrate surface and couple as pressure mode bulk waves with the front bevel 204, 206 mounted piezoelectric transducers 198, 200.

For a 90° emission/reception angle, the gratings 202, 208, are not perpendicular to the Love-wave axis of propagation 210, 2132, but rather rotated by an angle $\theta_g$ satisfying the following equation.

$$\tan(\theta_g)/V_{love} = \sin(\theta_s)/V_s$$

The Love-wave phase velocity $V_{Love}$ may be empirically determined, calculated based on the known properties of the laminated materials, or the angle $\theta_g$ can be varied experimentally to find the angle of maximum efficiency, which, in turn allows determination of the effective Love-wave phase velocity. As the Love wave and bulk shear wave phase velocities are not too dissimilar, and the angles are relatively small, the optimal value of $\theta_g$ will not be too far from $\theta_s$.

It is noted that the emission/reception angle need not be 90°. However, at angles other than 90°, some loss of efficiency is expected. The horizontal component of the shear motion of the bulk wave will no longer be parallel to the shear motion of the Love wave. For example, for an emission angle of 45°, a factor of 2 loss in efficiency is expected. This love-wave grating transducer design is simple and compact. It does not add manufacturing steps or additional parts compared to a simple tilted-piezo grating transducer, and possess the virtue of avoiding the need for a more expensive type piezoelectric element.

EXAMPLE 17

Figure 21:
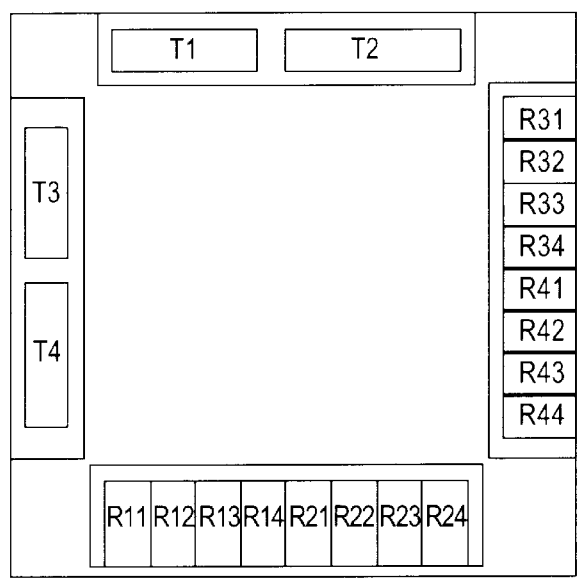
FIG. 21 shows a grating transducer according to the present invention which operates without reflective arrays.

There are a number of acoustic touchscreen system designs which operate without a reflective array. See, e.g., U.S. Pat. No. 3,673,327, Johnson and Freyberger (1972) and PCT application WO 94/02911 (PCT/JP93/01028, 1994) of Kohji Toda, both of which are incorporated by reference herein in their entirety. Grating transducers enable novel variations of such acoustic touchscreens. FIG. 21, which is analogous to FIGS. 16 and 19 of WO 94/02911, represents a design according to the present invention in which the "T"s are transmit grating transducers and the "R"s are receive grating transducers.

According to a preferred embodiment of the present invention, these grating transducers of FIG. 21 comprise a polyvinylidene fluoride ("PVDF") sheet on which a metallization pattern is formed, defining a plurality of piezoelectric elements. This PVDF subassembly is then mounted on a beveled surface of the substrate, to produce bulk waves which propagate toward respective grating elements. When using PVDF, it may be advantageous to employ an impedance-matching circuit local to the transducer, for example a field effect transistor ("FET") to allow use of low impedance cabling with relatively higher impedance PVDF interdigital transducers.

Compared to the interdigital piezoelectric elements bonded to the top surface of a glass substrate according to the prior art, gratings on the top surface and piezoelectric element acoustic transducers on the bottom surface (i.e. grating transducers) according to the present invention provide the following possible benefits: (a) simpler piezo electrode designs, e.g., no need for ¼ electrode line widths; (b) relative angular alignment of transducers more easily provided with a single pass printing of gratings; and (c) delicate piezoelectric elements and electrical connections moved to substrate surface away from user.

Figure 22:
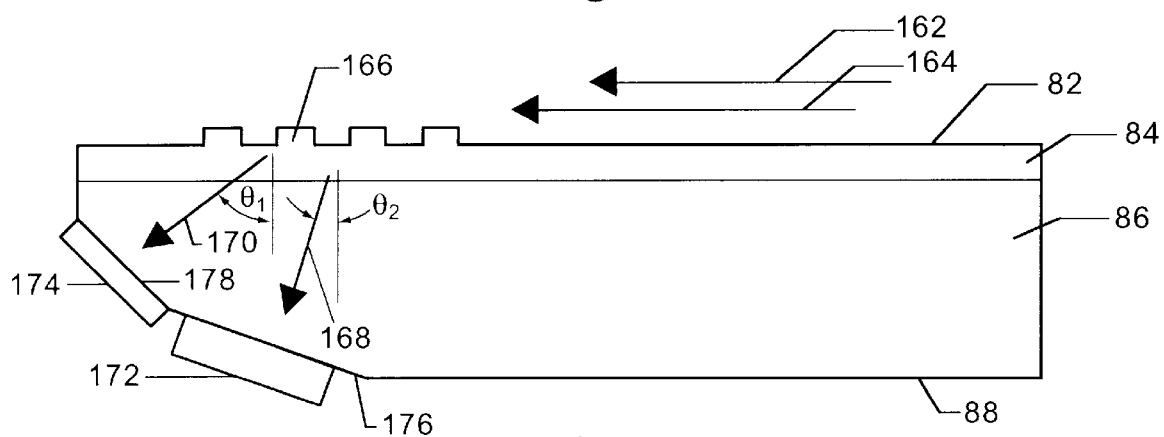
FIG. 22 shows a grating transducer according to the present invention wherein the grating couples two different waves to two piezoelectric transducers.

FIG. 22 shows a grating transducer having a relatively simple structure yet being coupled to two different wave modes, e.g. a Love wave 162 and a Rayleigh wave 164. The substrate 84, 86 supports propagation of Love waves, as well as Rayleigh waves. For example, the upper piezoelectric element 174 may be a pressure-mode piezoelectric element which is coupled to Rayleigh waves 164 via $\theta_1=\theta_B=60°$ pressure bulk wave, mounted on bevel surface 178 and the lower piezoelectric element 172 may be a horizontally polarized shear-mode piezoelectric element which is coupled to bulk shear waves 168 via $\theta_2=\theta_S=24°$ shear bulk wave, mounted on bevel surface 176. The grating 166 spacing may be calculated using the principles of Bragg scattering discussed above to couple both Rayleigh wave with a bulk pressure wave at $\theta_B=60°$ and the Love wave to a bulk shear wave at $\theta_S=24°$, in a manner which provides multiple useful peaks in its two dimensional Fourier transform. The propagation angle $\theta_B$ of the bulk shear wave may be calculated from the Love wave phase velocity, grating spacing, and bulk shear velocity. For aluminum ($\sigma=0.355$) and to the extent that the Love-wave velocity is similar to the Rayleigh-wave velocity, $\theta_B$ is approximately 24° for the bulk shear wave. Such a sensor can easily distinguish, e.g., a finger touch from a water drop from the ratio of Love-wave to Rayleigh-wave absorption.

In another embodiment, also exemplified by FIG. 22, a dual-mode grating transducer is provided which is sensitive to the zeroth order Love wave and the n=1 Love wave. In this case, both piezoelectric elements 172, 174 are horizontally polarized shear-mode piezoelectric elements and the substrate 84, 86 has an upper slower-shear-velocity layer 84 that is sufficiently thick to support propagation of Love waves of zero and first order. By preferentially absorbing shear energy at the surface, a touch may change the depth profile of shear mode energy and hence converts some of an incident, e.g., zeroth order Love wave 162 energy into, e.g., first order Love wave 164 energy. By transmitting an n=0 Love wave 162 and receiving an n=1 Love wave 164 or both an n=0 162 and n=1 164 Love wave, a positive touch signal or both positive and attenuative response sensor system is obtained. If only the positive touch signal is desired, then the grating transducers may be designed for the desired modes with single piezoelectric elements.

Grating transducers thus provide enhanced options for the choice of acoustic modes in acoustic touchscreens.

EXAMPLE 18

The acoustic source need not be a simple piezoelectric element with simple top and bottom electrodes. According to the present example, more complex acoustic sources are considered. These may include multiple piezoelectric elements and/or piezoelectric elements having complex electrode arrangements, as shown in FIG. 23.

In the case of relatively thick substrates, for example a 12 mm thick glass substrate 180, it may be preferable to mount the piezoelectric element 188 on a vertical edge 192 close to the grating 182 rather than on the bottom surface 194 that is relatively far from the grating 182. Such a closer piezoelectric element 188 location will help minimize diffractive spreading of the bulk wave 184 emitted from the piezoelectric element 188. In a preferred embodiment, the piezoelectric element 188 has a floating bottom electrode 190 and an exposed set of electrodes 192, 194 that is interdigital in geometry. The center-to-center spacing, s, of the neighboring interdigital electrodes 192, 194 corresponds to half of the bulk wave wavelength in the substrate divided by the cosine of the angle $\theta_B$ of the desired bulk wave 184 with respect to the vertical direction, i.e. $s=½*\lambda(bulk)/\cos(\theta_B)$. Note that all interdigital electrodes 192, 194 are held at a common voltage during poling, but during operation are connected with alternating polarities as indicated.

Figure 23:
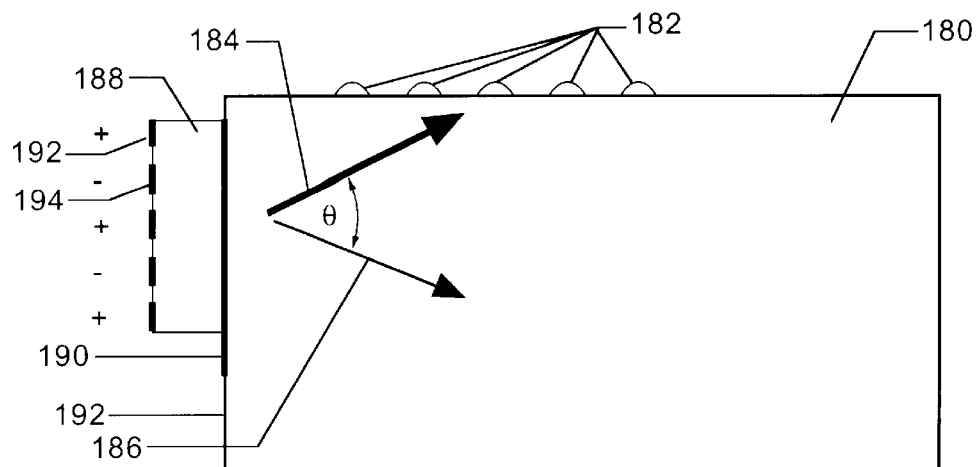
FIG. 23 shows a grating transducer according to the present invention having a complex piezoelectric transducer element to steer the coupling with a bulk wave in the substrate.

A 3 dB loss of efficiency in the design shown in FIG. 23 is expected as compared to the design shown in FIG. 1, because both upward 184 and downward 186 propagating bulk waves will be generated by the piezoelectric element 188. Alternately, with a sufficiently small interdigital electrode spacing, and electronics that can control individual phasing of signals to or from each electrode so that adjacent electrodes need not be of alternating phase, the downward propagating bulk wave 186 can be eliminated.

EXAMPLE 19

As known in the prior art, a pair of appropriately disposed and constructed gratings on a substrate may be employed to transfer wave energy from a first surface of a substrate to a second surface of a substrate. See, Humphryes and Ash (1969), incorporated herein by reference in its entirety. Thus this structure may be considered a "via". According to the present invention, such a structure allows the use of any structure, including a wedge transducer or grating transducer, to generate a wave having surface energy on a first surface of the substrate, which may then be efficiently transferred to a second surface of the substrate, thus removing the acoustic wave generating structures to a separate substrate surface than the reflective arrays or touch surface. Such an arrangement also allows an acoustic wave to pass a normally obstructive or interfering structure.

Figure 24A:
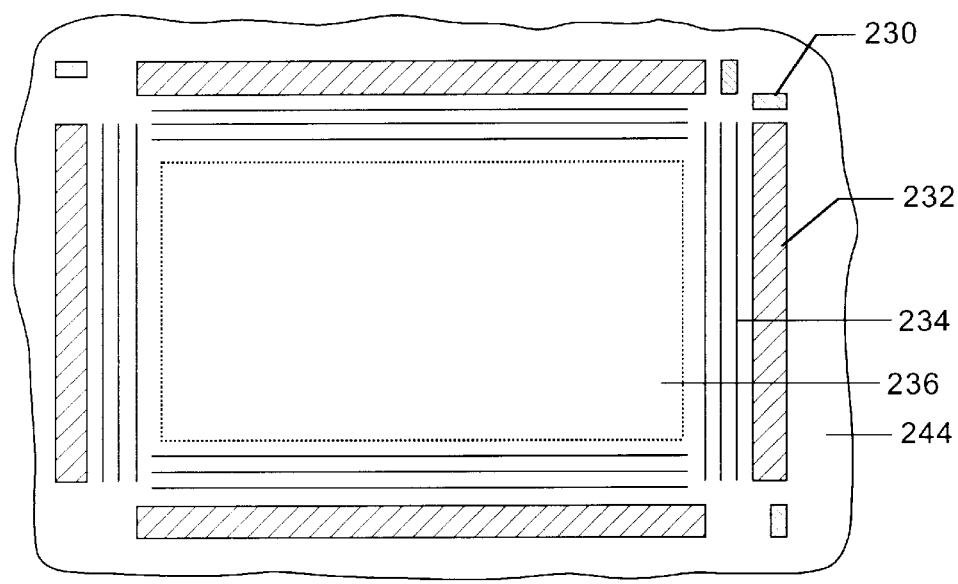
FIG. 24A shows a system according to the present invention with a pair of grating structures which transfer acoustic energy between a rear surface and a front surface of the substrate.
Figure 24B:
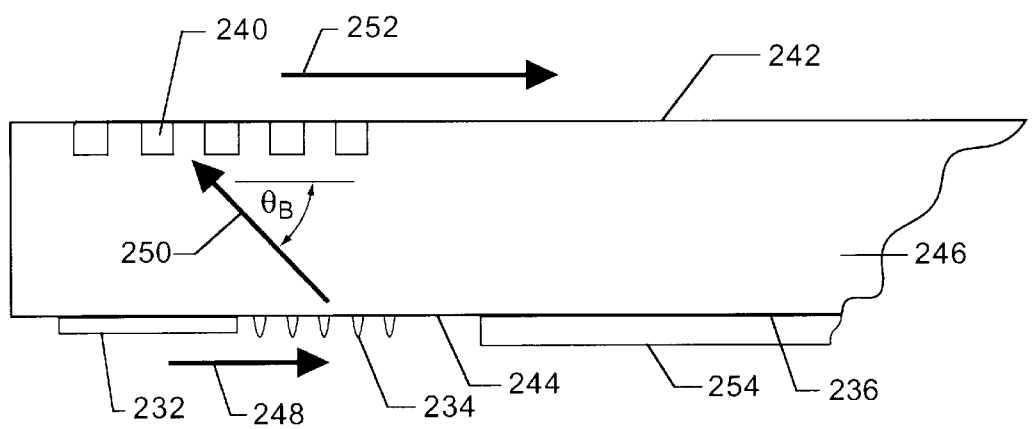
FIG. 24B shows how a touch sensor system employing the system shown in FIG. 23A has a simplified front surface architecture, without piezoelectric elements or wedge transducers.
Figure 24C:
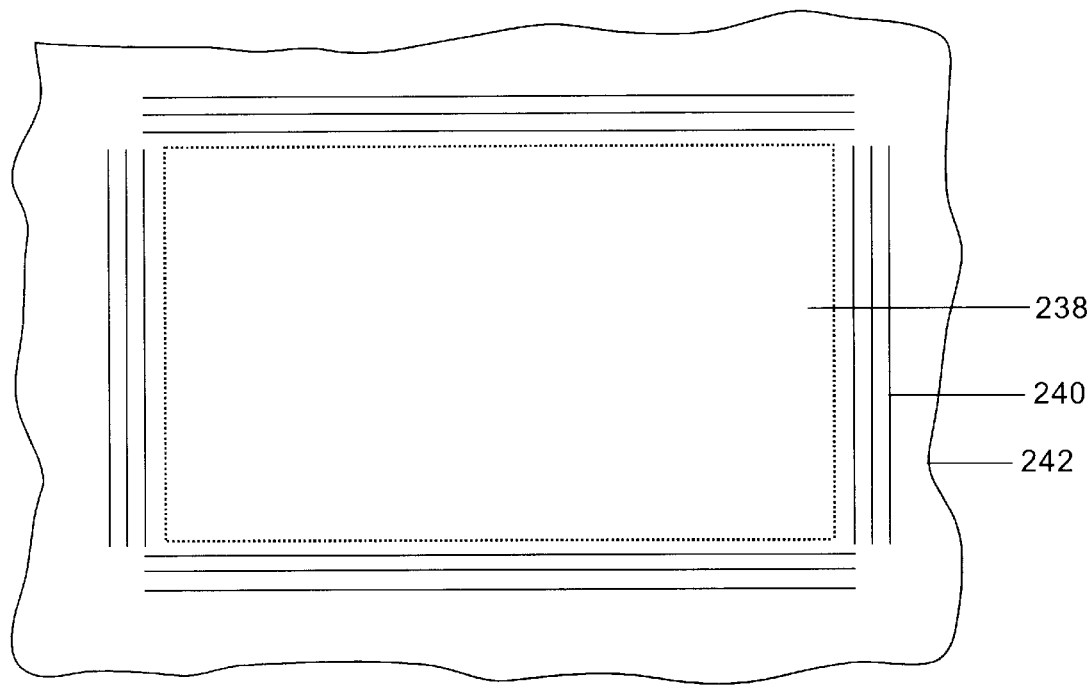
FIG. 24C shows the rear surface of the touch sensor system according to FIG. 23B, wherein an acoustic transducer, reflective array and elongated grating structure are provided on the rear surface of the substrate, while allowing front surface touch sensitivity.

FIGS. 24A, 24B and 24C illustrate an embodiment that utilizes such acoustic vias as a means to provide a touch surface 238 located arbitrarily on the surface 242 of a larger uninterrupted substrate. The substrate 246 may be, for example, a sheet of 6 mm thick tempered soda-lime glass that is large enough to serve as a table top or a counter top. The design engineer can locate the touch sensitive zone 238 arbitrarily within the uninterrupted top surface 242 of the substrate. Only four elongated sets of gratings 240 appear on the front surface 242. In a preferred embodiment, these gratings are grooves that are back-filled with a clear epoxy in such fashion that there is no interruption of the flat top substrate surface 242. In particular, note that there are no reflective arrays or transducer components on the top substrate surface.

Behind the touch sensitive zone, a display device is optically bonded in a bonding region 236 with a suitable bonding material 254 to the back surface 244 of the substrate. The display device (not shown in the drawings) may be, for example, a 10.4" liquid crystal display. Alternately, the display device may include a reverse projection screen that is optically bonded to the substrate. Thus, a design engineer can locate a touch/display interface on an uninterrupted surface of, e.g., a restaurant counter top for ordering food, or an office worker's desktop as an Internet/intranet interface.

On the bottom surface 244 of the substrate 246, four multi-element grating 234 and four Rayleigh-wave wedge transducers 230 are provided in an arrangement similar to, e.g., the system shown in FIG. 1. Note that the usual acoustic paths between the reflective array 232 pairs are blocked by the acoustically absorbing optical bonding 254 of the display device. Between the reflective arrays 232 and the display device are placed gratings 234. Many options are available for fabrication of the gratings and reflective arrays, including printing, scribing, etching, and other ablative or additive processes.

The pairs of gratings on the top and bottom surfaces serve as acoustic vias to transfer the energy of Rayleigh waves 248, 252 between the two surfaces. In a preferred embodiment, a bulk shear wave 250 propagating at $\theta_B = -45°$ with respect to the vertical axis couples to the gratings 234, 240 and hence satisfies the condition for F=1 for soda-lime glass. The grating spacing, p, may be calculated with the aid of the following equation:

$$p = (V_R/f)/(1 - \sin(\theta_B) + (V_R/V_B))$$

For example, for an operating frequency of f=5 MHz, a Rayleigh wave velocity of $V_R = 3.16$ mm/μsec, and a bulk (shear) velocity of $V_B = 3.43$ mm/μsec, and $\theta_B = -45°$, the grating spacing is p=383 μm. The grating structure may be, for example, 1 cm wide and contain about 25 grates.

This embodiment illustrates the utility of an acoustic via which is a form of grating transducer, and more generally the use of the grating transducer mechanism in an embodiment without a piezoelectric element bonded directly to the substrate.

EXAMPLE 20

According to the present invention, the grating need not be a series of lines on a planar surface, but may include more advanced design considerations. For example, this allows the use of a single transducer for multiple axis sensitivity. Thus, a common X/Y receive or transmit grating transducer is possible.

Referring to FIG. 9, one embodiment of a common X/Y grating transducer is where piezoelectric elements 60*a* and 60*b* are replaced with a single piezoelectric element approximately doubled in length. Optionally, the two sets of gratings 54*a* and 54*b* can be extended so as to overlap forming a superposed grating structure with two useful two dimensional Fourier components. Alternately, such a grating pattern of overlapping lines can be replaced by the negative of the grid pattern, i.e., a lattice of reflector dots with a diamond-shaped unit cell.

Figure 25:
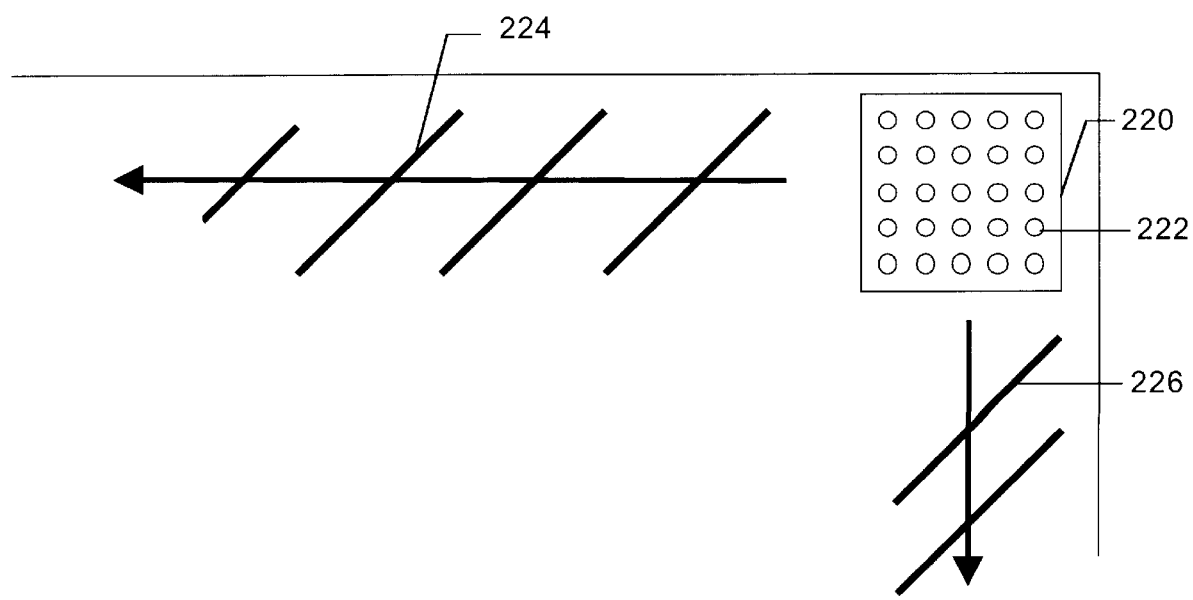
FIG. 25 shows a grating transducer according to the present invention with two significant acceptance angles in the plane of the substrate and thus coupling to two different converted waves.

FIG. 25 shows a grating transducer of similar design with a horizontally mounted piezoelectric element 220, i.e., $\theta_B = 0°$. The grating in this case is a square or rectangular array of dots 222 whose center-to-center spacing in both the X and Y directions is about one wavelength of, e.g., Rayleigh waves. The piezoelectric element 220 under this grating 222 will respond to signals from both the X 224 and Y 226 arrays. It is noted that the signal generated by the piezoelectric element 222 may include a plurality of frequency components. The spacing of the elements along any axis will determine the scattering characteristics, so that the grating may be selective for frequencies along differing axes. Thus, in the $\theta_B = 0°$ case, a rectangular lattice would permit a first frequency to propagate along one axis and a second frequency to propagate along a second axis. For the $\theta_B \neq 0°$ case, the rectangular lattice is replaced with a parallelogram lattice.

EXAMPLE 21

Figure 26A:
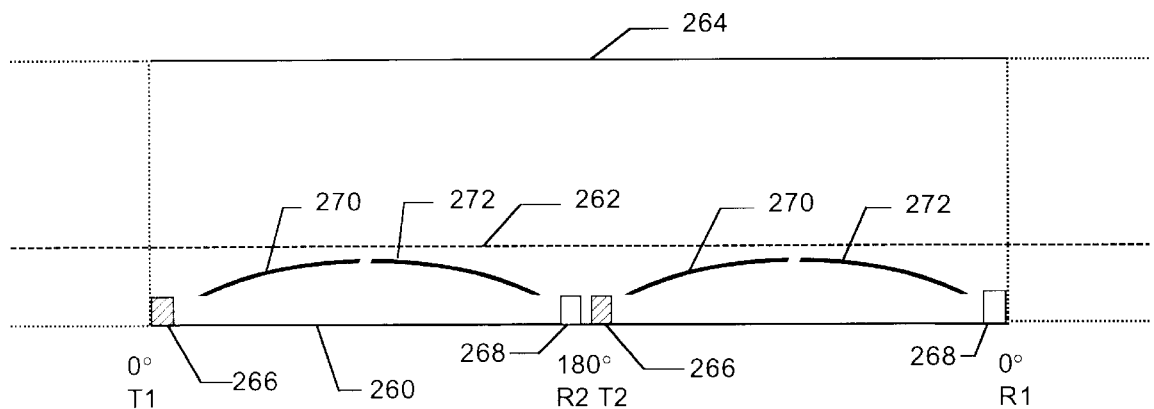
FIGS. 26A and 26B show a system according to the present invention, showing wave paths for a hemispheric sensor system employing grating transducers in a Mercator projection and plan view, respectively.
Figure 26B:
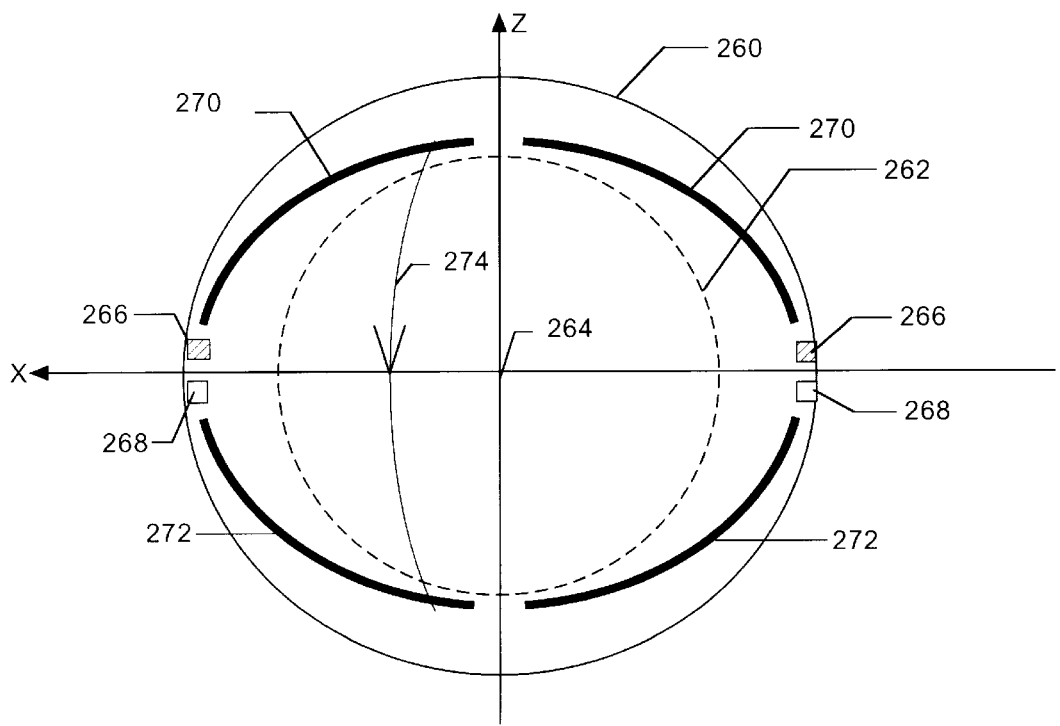

FIGS. 26A and 26B provide an example of a non-planar, e.g., hemispherical sensor, wherein the touch surface corresponds to everything north of the "Tropic of Cancer" at 23.5° N latitude, and the region between the equator and the Tropic of Cancer is available for arrays and transducers. FIG. 26A provides a Mercator projection on which is represented the touch zone, two transmit grating transducers, two transmit reflective arrays, two receive reflective arrays, and two receive grating transducers. These elements form two sensor subsystems, which are also shown on the plan view projection of FIG. 26B. Together, these two sensor subsystems (typically designed to slightly overlap by extending and superposing the reflective arrays) provide for the measurement of one coordinate over the entire touch zone.

Such a sensor can serve as an "ultrasonic trackball", i.e., an input device with no moving parts with the look, feel and function of a mechanical trackball. One "rolls" this ultrasonic trackball by moving one's finger on the touch zone with a component motion in the X direction. Associated controller electronics may process the touch information and send data to the host computer in the same format as a standard mechanical track ball.

Additional sensor subsystems may be superposed on the sensor subsystems shown in FIGS. 26A and 26B. With a total of eight grating transducers and eight reflective arrays, two dimensional touch positions on the touch zone surface may be fully reconstructed. With a total of twelve grating transducers and arrays, e.g., by including copies of components shown in FIG. 26A rotated by +60° and −60° with respect to the Y axis (through the north pole 264), the touch zone can be fully covered with a redundant set of three coordinate measurements. Such redundancy enhances options for the development of robust algorithms that can process multiple touch information.

Use of grating transducers enables the piezoelectric elements, electrical connections, and perhaps the controller electronics itself to be placed in the interior of the hemisphere substrate shell. Thus, grating transducers enable ultrasonic trackballs with mechanical constructions of improved robustness and compactness.

In one embodiment, the substrate is formed of a 15 cm-diameter 3 mm thick hemispherical steel shell. Such an ultrasonic trackball may be subjected to considerable physical abuse and still remain fully functional. Hence, an input device is provided having trackball functionality for public access kiosks.

In an alternate embodiment, the substrate's hemispheric is distorted to provide a better ergonomic fit to the user's hand. Note that this is not an option for a mechanical trackball.

In still another embodiment, the substrate is formed of a 5 cm diameter, 3 mm thick hemispheric shell of polystyrene, e.g., Styron® 666 from Dow Chemical. Note that in this embodiment, the substrate, including reflective arrays, gratings, and angled surfaces for mounting the piezoelectric elements of the grating transducers may all be included in a mold design. This supports low cost manufacturing processes. Optionally, the operating frequency for such a polystyrene sensor is 2 MHz. given a Rayleigh wave velocity of 0.99 mm/μsec, as can be calculated from bulk shear wave and pressure velocities, the wavelength $\lambda_R$ is about ½ mm. Note that this is essentially the same as the Rayleigh wavelength in glass at an operating frequency of about 5 MHz. As acoustic attenuation is a strong monotonically increasing function of frequency, such a lowered operating frequency assures that acoustic attenuation is sufficiently low to support the maximum path length of less than 15 cm for a 5 cm diameter sensor. In the published literature, Styron® 666 stands out amongst polymers as having a low acoustic attenuation for bulk pressure waves: 1.8 dB/cm at 5 MHz. See, (see, http://www.ultrasonic.com/Tables/plastics.html). Scaled to 2 MHz, this is less than about 0.72 dB/cm or about 10 dB for a 15 cm path length. U.S. Pat. No. 5,648,643 discloses the use of polystyrene in shear-mode acoustic touchscreens. As Rayleigh waves are a mixture of shear and longitudinal acoustic energy, it is believed that similar scale acoustic losses will be observed, and that existing acoustic touchscreen controller designs may be employed in such a sensor system.

In the R1/T1 and R2/T2 sensor subsystems shown in FIGS. 26A and 26B, the transmit array 270 follows a section of a great circle that intersects the X axis and is rotated by an angle Θ about the X axis with respect to the equatorial plane 260. The tilt angle, say Θ=20°, is less than the 23.5° latitude of the Tropic of Cancer 262. The grating transducer shown in FIG. 15 may be used. Either the piezoelectric elements 266, 268 are mounted with their long axis in the vertical direction and the grating is designed for an emission angle of $\theta_E$=Θ, or a $\theta_E$=0° design may be used in which the whole grating transducer structure itself, including the piezoelectric element 266, 268, is rotated by the angle Θ. One option is an F=1 design in which the shear mode piezoelectric elements 266, 268 are mounted on the polystyrene substrate with a negative tilt angle of $\theta_B$=30°.

The reflective array 270, 272 design is largely independent of the type of transducers used, but is discussed below for completeness.

The reflective arrays 270, 272 form segments of great circles. The transmit array 270 follows the following trajectory on the surface of the hemisphere:

$x(s)=R \cdot \cos(\pi s/2)$ $y(s)=R \cdot \sin(\Theta) \cdot \sin(\pi s/2)$ $z(s)=R \cdot \cos(\Theta) \cdot \sin(\pi s/2)$ Here, R is the radius of the hemisphere, e.g., 2.5 cm. The definitions used here for the x, y, and z directions are shown in FIG. 26B. Similarly, the trajectory for the receive array is as follows.

$x(s)=R \cdot \cos(\pi s/2)$ $y(s)=R \cdot \sin(\Theta) \cdot \sin(\pi s/2)$ $z(s)=-R \cos(\Theta) \cdot \sin(\pi s/2)$ In these formulae, s is the path parameter which nominally increases monotonically with the delay time corresponding to the corresponding acoustic paths 274 between the transmit 266 and receive 268 transducers. In this example, the array will start for a small positive value of s and will end at a value of s slightly greater than one in order to provide the overlap between the sensor subsystem pairs discussed above.

Now consider the (θ,φ) coordinate system for the surface of the hemisphere defined by the following relations.

$-\pi/2 < \theta < \pi/2 \quad 0 < \phi < \pi$ $x(\theta,\phi)=R \cdot \cos(\theta) \cdot \cos(\phi)$ $y(\theta,\phi)=R \cdot \cos(\theta) \cdot \sin(\phi)$ $z(\theta,\phi)=R \cdot \sin(\theta)$ In terms of this coordinate system, the transmit array follows the trajectory:

$\theta(s)=\arcsin(\cos(\Theta) \cdot \sin(\pi s/2))$ $\phi(s)=\arctan(\sin(\Theta) \cdot \tan(\pi s/2))$ and the receive array follows the following trajectory:

$\theta(s)=-\arcsin(\cos(\Theta) \cdot \sin(\pi s/2))$ $\phi(s)=\arctan(\sin(\Theta) \cdot \tan(\pi s/2))$ The acoustic path through the touch zone is also a segment of a great circle. The great circle connecting the transmit 270 and receive 272 arrays for the path parameter s is a segment of a line of longitude with respect to the Z axis, namely the following section of a great circle:

$-\arcsin(\cos(\Theta) \cdot \sin(\pi s/2)) < \theta < \arcsin(\cos(\Theta) \cdot \sin(\pi s/2))$ $\phi=\arctan(\sin(\Theta) \cdot \tan(\pi s/2))$ While Love waves and other acoustic modes may be useful for some embodiments, a design in which Rayleigh waves of velocity $V_R$ is employed is discussed below in further detail. The delay time as a function of path parameter is given as follows.

$T(s)=(R \cdot (\pi s/2))/V_R+2R \cdot \arcsin(\cos(\Theta) \cdot \sin(\pi s/2))/V_R+(R \cdot (\pi s/2))/V_R$ The delay time can also be expressed in terms of the coordinate φ of a touch which intercepts the acoustic path.

$T(\phi)=(2R/V_R) \cdot \arctan(\tan(\phi)/\sin(\Theta))+2R \cdot \arcsin(\cos(\Theta) \cdot \sin(\arctan(\tan(\phi)/\sin(\Theta))))/V_R$ With this analytic expression, a look-up table may be calculated. Such a look-up table can be used in real-time microprocessor code to convert measured delay times of signal perturbations into the touch coordinate φ.

Reflector spacing and angles can be calculated using previously discussed principles. Let us refer again to this first sensor subsystem in FIG. 26B. For the transmit array, the reflector spacing vector is $S=2\pi n(k_t(s)-k_p(s))/|k_t(s)-k_p(s)|^2$ where $k_t(s)$ and $k_p(s)$ can be calculated from the known array trajectory (θ(s), φ(s)) given above by the following expressions.

$k_t(s)=(2 \pi/\lambda_R) \cdot (-\sin \pi s/2), \sin(\Theta) \cdot \cos(\pi s/2), \cos(\Theta) \cdot \cos(\pi s/2))$ $k_p(s)=(2 \pi/\lambda_R) \cdot (-\cos(\phi(s)) \sin(\theta(s)), -\sin(\phi(s)) \sin(\theta(s)), \cos(\theta(s)))$ Here $\lambda_R$ represents the Rayleigh wavelength. The magnitude of S provides the center-to-center distance between the reflectors in the direction perpendicular to the reflectors, and the direction of S is perpendicular to the reflector elements.

There has thus been shown and described novel receptacles and novel aspects of touchscreen transducer systems, which fulfill all the objects and advantages sought therefor. Many changes, modifications, variations, combinations, subcombinations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. An acoustic touch sensing device, comprising:
   (a) a substrate, having a surface;
   (b) an acoustic wave transducer, coupling to a first wave, being a bulk wave, propagating through said substrate along an axis intersecting said surface;
   (c) a diffractive acoustic wave mode coupler, coupling energy of said first wave to a second wave having a converted wave mode with appreciable energy at said surface and propagating along an axis parallel to said surface; and
   (d) means for detecting a perturbation of the energy of said second wave.

2. The device according to claim 1, wherein said acoustic wave transducer comprises means for propagating bulk waves in an oblique direction with respect to said surface.

3. The device according to claim 1, wherein said acoustic wave transducer couples said first wave directly to said diffractive acoustic wave mode coupler.

4. The device according to claim 1, wherein said acoustic wave transducer couples said first wave to said diffractive acoustic wave mode coupler through at least one acoustic reflection in the path of said first wave.

5. The device according to claim 1, wherein said diffractive acoustic wave mode coupler couples to a third wave comprising energy of said first wave having a different wave mode than said first wave.

6. The device according to claim 1, further comprising a second acoustic wave transducer, coupling to an eighth wave, being a bulk wave, propagating through said substrate along an axis intersecting said surface, said diffractive acoustic wave mode coupler coupling energy of said eighth wave to a ninth wave, distinct from said second wave, having a converted wave mode with appreciable energy at said surface and propagating along an axis parallel to said surface.

7. The device according to claim 1, wherein said diffractive acoustic wave mode coupler comprises a set of scattering centers.

8. The device according to claim 7, wherein said set of scattering centers are disposed on said surface.

9. The device according to claim 1, wherein said diffractive acoustic wave mode coupler comprises a set of spaced elements having an acoustic characteristic differing from surrounding areas of said substrate.

10. The device according to claim 9, wherein said elements comprise regularly spaced elongated linear grates.

11. The device according to claim 9, wherein said elements comprise regularly spaced elongated curved grates.

12. The device according to claim 1, wherein said diffractive acoustic wave mode coupler comprises a periodic acoustic perturbation of said substrate.

13. The device according to claim 1, further comprising a set of elements disposed along at least a portion of a path of said second wave for reflecting a portion of the energy of said second wave as a set of fourth waves, each propagating parallel to said surface along an axis different than an axis of propagation of said second wave.

14. The device according to claim 13, wherein said set of fourth waves have distinct characteristic time delays which vary incrementally and monotonically.

15. The device according to claim 14, further comprising a set of elements disposed along a path intersecting said axes of said set of fourth waves, reflecting at least a portion of the energy of said set of fourth waves toward a common receiver, said common receiver producing a signal related to an energy of said reflected portion of said set of fourth waves.

16. The device according to claim 15, wherein said means for detecting a perturbation of the energy of said second wave comprises means for analyzing a signal from said common receiver to detect a perturbation of energy received thereby.

17. The device according to claim 1, further comprising a plurality of said acoustic wave transducers, each coupling to a different bulk wave propagating through said substrate along an axis intersecting said surface, the energy of said different bulk waves each being coupled to a wave having a converted wave mode with appreciable energy at said surface and propagating along an axis parallel to said surface by a diffractive acoustic wave mode coupler.

18. The device according to claim 17, wherein at least two of said converted wave modes coupled to said different bulk waves propagate along parallel paths.

19. The device according to claim 1, further comprising a wave disperser and a wave condenser, each sequentially disposed along a different a portion of a path of acoustic energy of said wave having appreciable energy at said surface, said wave disperser and said wave condenser being separated by a portion of said surface adapted for touch sensing.

20. The device according to claim 19, further comprising a second acoustic wave transducer, coupling to a fifth wave, being a bulk wave, propagating through said substrate along an axis intersecting said surface, said fifth wave being coupled to a sixth wave having a converted wave mode with appreciable energy at said surface and propagating along an axis parallel to said surface; said second wave having a path including at least a portion of said wave disperser and said sixth wave having a path including at least a portion of said condenser.

21. The device according to claim 1, wherein said detecting means detects a location of said perturbation.

22. The device according to claim 1, wherein said surface is planar.

23. The device according to claim 1, wherein said surface is smooth and nonplanar, said axis of propagation of said second wave locally varying to conform to said surface.

24. The device according to claim 1, wherein said acoustic wave transducer comprises a flat acoustic coupling surface, said flat acoustic coupling surface being inclined with respect to a portion of said surface intersected by said first wave.

25. The device according to claim 1, wherein said acoustic wave transducer comprises a piezoelectric element.

26. The device according to claim 1, wherein said acoustic wave transducer comprises a diffractive acoustic wave coupler, coupling a seventh acoustic wave with said first wave.

27. The device according to claim 1, wherein said first wave has an axis of propagation whose projection onto said surface differs from an axis of propagation of said second wave.

28. The device according to claim 1, wherein said first wave has one or more oscillation components selected from the group consisting of a pressure mode, a vertical shear mode and a horizontal shear mode.

29. The device according to claim 1, wherein said second wave has one or more oscillation components selected from the group consisting of longitudinal mode, horizontally polarized shear mode and vertically polarized shear mode.

30. The device according to claim 1, wherein said second wave comprises a Rayleigh-type wave.

31. The device according to claim 1, wherein said second wave comprises a Love-type wave.

32. The device according to claim 1, wherein said substrate has inhomogeneous acoustic properties.

33. The device according to claim 1, wherein said substrate has comprises layers parallel to said surface having different acoustic properties.

34. The device according to claim 1, wherein said first wave propagates along an axis having an inclination of at least $|\pi/8|$ radians with respect to a plane tangent to said surface at said intersection.

35. The device according to claim 1, wherein said first wave comprises a shear-mode component and has a projection of an axis of propagation having an angle whose magnitude is at least 45° with respect to an axis of propagation of said second wave.

36. The device according to claim 1, wherein said acoustic wave transducer couples to a pressure-mode bulk wave and said second wave comprises a horizontally polarized shear wave.

37. The device according to claim 1, wherein substantially only said first wave propagating parallel to said axis intersecting said surface satisfies the horizontal components of the Bragg scattering conditions of said diffractive acoustic wave mode coupler at a particular acoustic frequency.

38. The device according to claim 1, wherein said diffractive acoustic wave mode coupler comprises a set of elements formed on said surface from a composition comprising glass frit.

39. The device according to claim 1, wherein said diffractive acoustic wave mode coupler comprises a set of elements formed on said surface from a composition comprising a polymer matrix.

40. The device according to claim 1, wherein said diffractive acoustic wave mode coupler comprises a set of elements formed on said surface from a dense inorganic composition filled polymer.

41. The device according to claim 1, wherein said diffractive acoustic wave mode coupler comprises a set of grooves formed in said surface.

42. The device according to claim 1, wherein said diffractive acoustic wave mode coupler serves as an acoustic lens.

43. The device according to claim 1, wherein said diffractive acoustic wave mode coupler satisfies a Bragg scattering condition for coupling at least two bulk waves to at least two useful waves having a converted wave mode, each with appreciable energy at said surface and propagating along an axis parallel to said surface.

44. The device according to claim 1, wherein said acoustic wave transducer couples to said first wave in said substrate having an axis of propagation substantially normal to said surface.

45. The device according to claim 1, wherein said first wave resonates in said substrate.

46. The device according to claim 1, wherein a portion of an acoustic wave path includes partial acoustic reflections having reflected angles totaling about an integral multiple of $2\pi$ radians.

47. The device according to claim 1, wherein said acoustic wave transducer is coupled to a signal and said substrate exhibits an acoustic resonance at a frequency, said acoustic wave transducer being coupled to said acoustic resonance at said frequency, thereby to substantially achieve a relative maximum acoustic power coupling efficiency between said first wave and said signal for a given signal amplitude.

48. The device according to claim 1, wherein said substrate is a material selected from the group consisting of soda-lime glass, borosilicate glass, a crown glass, a barium-containing glass, a strontium-containing glass, a boron-containing glass, a glass laminate capable of supporting Love wave propagation; a ceramic, aluminum, a coated aluminum substrate capable of supporting Love wave propagation, and a low-acoustic-loss polymer.

49. The device according to claim 1, further comprising means for reflecting portions of said second wave as an incrementally varying set of waves comprising an array of elements formed during an operation integral with an operation forming said diffractive acoustic wave mode coupler.

50. The device according to claim 1, further comprising means for selectively reflecting portions of said second wave as a set of dispersed waves propagating through said substrate, said selective reflecting means having a set of Fourier components which poorly couples to unconverted portions of said first bulk wave.

51. The device according to claim 1, wherein said diffractive acoustic wave mode coupler comprises at least one element having an asymmetric profile along an axis of propagation of said second wave.

52. The device according to claim 1, wherein said acoustic wave transducer comprises a ceramic piezoelectric element.

53. The device according to claim 1, wherein said acoustic wave transducer comprises a polymer piezoelectric element.

54. The device according to claim 1, wherein said acoustic wave transducer is mounted to said substrate at a region mechanically protected on at least two sides by said substrate.

55. A substrate for an acoustic sensing device, having a region, and a surface, comprising:
(a) an acoustic transducer, coupling to a bulk wave in said substrate having an axis of propagation intersecting said surface;
(b) a diffractive acoustic wave mode coupling structure, formed proximate to said surface, adapted to convert acoustic wave energy of the bulk wave to a wave propagating along an axis parallel to said surface; and
(c) means for detecting acoustic converted acoustic wave energy in a manner adapted for determining a position of a perturbation thereof.

56. The substrate according to claim 55, wherein said detecting means comprises means for coupling the converted acoustic wave energy with an incrementally varying set of dispersed waves propagating through said region.

57. The substrate according to claim 55, further comprising a plurality of acoustic transducers coupled respectively to a bulk wave in said substrate, each bulk wave having an axis of propagation intersecting said surface at an incrementally varying offset.

58. A method of sensing touch on a substrate having a surface, comprising the steps of:
transducing a bulk wave in the substrate propagating through said substrate along an axis intersecting the surface;
diffractively coupling energy of the bulk wave to a wave having a converted wave mode with appreciable energy at the surface and propagating along an axis parallel to the surface; and detecting a perturbation of the wave having a converted wave mode.

59. The method according to claim 58, wherein a mode of the bulk wave is converted between said transducing and said diffractively coupling.

60. The method according to claim 58, further comprising the step of reflecting the bulk wave between said transducing and said diffractively coupling.

61. The method according to claim 58, further comprising the step of focusing the wave having a converted wave mode.

62. The method according to claim 58, further comprising the step of reflecting a portion of the energy of the wave having a converted wave mode as a set of temporally varying dispersed waves, each propagating parallel to said surface along a redirected axis.

63. The method according to claim 62, further comprising the step of reflecting at least a portion of the energy of the temporally varying dispersed waves toward a common receiver.

64. The method according to claim 63, further comprising the step of analyzing a perturbation of the energy received by the common receiver.

65. The method according to claim 58, further comprising the step of resonating the bulk wave in the substrate.

66. The method according to claim 58, further comprising the steps of dispersing the wave having a converted wave mode over a region adapted for sensing touch and condensing the dispersed wave after traversing the region adapted for sensing touch.

67. The method according to claim 66, further comprising the step of diffractively coupling at least a portion of the condensed dispersed wave to a bulk wave and transducing the coupled condensed dispersed wave.

68. The method according to claim 58, further comprising the step of analyzing a position of the detected perturbation.

69. The method according to claim 58, wherein said energy of the bulk wave is scattered as a plurality of wave modes by at least one scattering center, including the wave having a converted wave mode, further comprising the step of selectively distinguishing the wave having a converted wave mode.

70. The method according to claim 69, wherein the wave having a converted wave mode is selectively distinguished by an interaction of the acoustic energy of the bulk wave with the at least one scattering center and an additional scattering center oriented with respect to the scattering center to selectively generate acoustic wave interference.

71. The device according to claim 1, wherein an acoustic wave path includes partial acoustic reflections such that a delayed portion of the acoustic wave is essentially superposed on a portion of the acoustic wave.

72. The device according to claim 1, wherein said diffractive acoustic wave mode coupler has a low conversion efficiency and said bulk wave resonates in said substrate in a region of said diffractive acoustic wave mode coupler.

73. The device according to claim 1, wherein said second wave has a nominal touch sensing path and said detecting means is responsive to a parasitic wave selected from the group consisting of said first wave, said second wave traveling outside said nominal touch sensing path and a third wave derived from said first wave or said second wave and having a wave-mode differing therefrom, further comprising means for reducing an interference of said third wave with a detection of said perturbation of the energy of said parasitic wave.

* * * * *

UNITED STATES PATENT AND TRADEMARK OFFICE
CERTIFICATE OF CORRECTION

PATENT NO. : 6,091,406
DATED : July 18, 2000
INVENTOR(S) : Shigeki Kambara, Hiroshi Kaneda, Robert Adler, Joel Kent, Bruce W. Maxfield, Masao Takeuchi It is certified that error appears in the above-indentified patent and that said Letters Patent is hereby corrected as shown below:

Title Page  [30] Foreign Application Priority Data:
December 25, 1996 [JP] Japan.......08-345812

Signed and Sealed this

Eighth Day of May, 2001

Attest:

NICHOLAS P. GODICI

Attesting Officer    Acting Director of the United States Patent and Trademark Office